United States Patent [19]

Burke

[11] Patent Number: 5,222,542
[45] Date of Patent: * Jun. 29, 1993

[54] METHOD FOR FORMING METAL MATRIX COMPOSITE BODIES WITH A DISPERSION CASTING TECHNIQUE

[75] Inventor: John T. Burke, Hockessin, Del.

[73] Assignee: Lanxide Technology Company, LP, Newark, Del.

[*] Notice: The portion of the term of this patent subsequent to Mar. 19, 2008 has been disclaimed.

[21] Appl. No.: 672,064

[22] Filed: Mar. 18, 1991

Related U.S. Application Data

[63] Continuation-in-part of Ser. No. 269,308, Nov. 10, 1988, Pat. No. 5,000,247.

[51] Int. Cl.$^5$ .............................................. B22D 19/14
[52] U.S. Cl. ................................... 164/97; 164/101
[58] Field of Search ............... 164/91, 97, 98, 100, 164/101, 102, 103, 104, 105

[56] References Cited

U.S. PATENT DOCUMENTS

| | | | |
|---|---|---|---|
| 2,951,771 | 9/1960 | Butler | 117/114 |
| 3,031,340 | 4/1962 | Girardot | 117/118 |
| 3,149,409 | 9/1964 | Maruhn | 29/156.5 |
| 3,547,180 | 12/1970 | Cochran et al. | 164/51 |
| 3,608,170 | 9/1971 | Larson et al. | 29/149.5 |
| 3,868,267 | 2/1975 | Gazza et al. | 264/60 X |
| 3,915,699 | 10/1975 | Umehara et al. | 419/17 |
| 3,969,553 | 7/1976 | Kondo et al. | 427/299 |
| 4,082,864 | 4/1978 | Kendall et al. | 427/248 |
| 4,376,803 | 3/1983 | Katzman | 428/408 |
| 4,376,804 | 3/1983 | Katzman | 428/408 |
| 4,404,262 | 9/1983 | Watmough | 428/539.5 |
| 4,450,207 | 5/1984 | Donomoto et al. | 428/614 |
| 4,473,103 | 9/1984 | Kenney et al. | 167/97 |
| 4,559,246 | 12/1985 | Jones | 427/299 |
| 4,570,316 | 2/1986 | Sakamaki et al. | 29/156.8 R |
| 4,587,177 | 5/1986 | Toaz et al. | 428/614 |
| 4,630,665 | 12/1986 | Novak | 167/97 |
| 4,657,065 | 6/1988 | Wada et al. | 148/11.5 A |
| 4,662,429 | 5/1987 | Wada et al. | 164/461 |
| 4,673,435 | 6/1987 | Yamaguchi et al. | 75/235 |
| 4,677,901 | 7/1987 | Ban et al. | 92/213 |
| 4,679,493 | 7/1987 | Munro et al. | 92/212 |
| 4,713,111 | 12/1987 | Cameron et al. | 75/68 R |
| 4,731,298 | 3/1988 | Shindo et al. | 428/611 |
| 4,753,690 | 6/1988 | Wada et al. | 168/461 |
| 4,759,995 | 7/1988 | Skibo | 420/532 |
| 4,777,014 | 10/1988 | Newkirk | 164/80 |
| 4,871,008 | 10/1989 | Dwivedi | 164/131 |
| 4,935,055 | 6/1990 | Aghajanian | 164/66.1 |
| 4,961,461 | 9/1990 | Klier et al. | 164/461 |
| 5,000,247 | 3/1991 | Burke | 164/97 |

FOREIGN PATENT DOCUMENTS

| | | | |
|---|---|---|---|
| 2819076 | 10/1979 | Fed. Rep. of Germany. | |
| 0144441 | 8/1983 | Japan. | |
| 2156718 | 4/1984 | United Kingdom. | |
| 2162104 | 1/1986 | United Kingdom | 164/97 |

Primary Examiner—Richard K. Seidel
Assistant Examiner—Rex E. Pelto
Attorney, Agent, or Firm—Mark G. Mortenson; Jeffrey R. Ramberg

[57] ABSTRACT

The present invention relates to a novel method for forming metal matrix composite bodies: A permeable mass of filler material is spontaneously infiltrated by a molten matrix metal. Particularly, an infiltration enhancer and/or an infiltration enhancer precursor and/or an infiltration atmosphere are in communication with the filler material, at least at some point during the process, which permits molten matrix metal to spontaneously infiltrate the filler material. After infiltration has been completed to a desired extent, additional matrix metal is added to that matrix metal which has spontaneously infiltrated the filler material to result in a suspension of filler material and matrix metal, said suspension having a lower volume fraction of filler relative to matrix metal. The matrix metal then can be permitted to cool in situ or the mixture of matrix metal and filler material can be poured into a second container as a casting process to form a desired shape which corresponds to the second container. However, the formed suspension, whether cast immediately after being formed or cooling and thereafter heating and casting, can be pour cast into a desired shape.

22 Claims, 13 Drawing Sheets

METHOD FOR FORMING METAL MATRIX COMPOSITE BODIES WITH A DISPERSION CASTING TECHNIQUE

CROSS REFERENCE TO RELATED APPLICATIONS

This application is a continuation-in-part of U.S. patent application Ser. No. 07/269,308, filed 11/10/88, having an issue date of Mar. 19, 1991, and having a U.S. Pat. No. of 5,000,247, and naming as sole inventor John Thomas Burke and entitled "Method For Forming Metal Matrix Composite Bodies With A Dispersion Casting Technique and Products Produced Thereby", the subject matter of which is incorporated herein by reference.

FIELD OF THE INVENTION

The present invention relates to a novel method for forming metal matrix composite bodies. A permeable mass of filler material is spontaneously infiltrated by a molten matrix metal. Particularly, an infiltration enhancer and/or an infiltration enhancer precursor and/or an infiltrating atmosphere are in communication with the filler material, at least at some point during the process, which permits molten matrix metal to spontaneously infiltrate the filler material. After infiltration has been completed to a desired extent, additional matrix metal is added to that matrix metal which has spontaneously infiltrated the filler material to result in a suspension of filler material and matrix metal having a lower volume fraction of filler relative to matrix metal. The matrix metal then can be permitted to cool in situ or the mixture of matrix metal and filler material can be poured into a second container as a casting process to form a desired shape which corresponds to the second container. However, the formed suspension, whether cast immediately after being formed or after cooling and thereafter heating and casting, can be pour cast into a desired shape while retaining beneficial characteristics associated with spontaneously infiltrated metal matrix composites.

BACKGROUND OF THE INVENTION

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75-375 kg/cm$^2$ to force molten aluminum (or molten aluminum alloy) into a fibrous or whisker mat of alumina which has been preheated to 70° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968, to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which can be formed into a preform, with molten matrix metal (e.g., aluminum) in the presence of an infiltrating atmosphere (e.g., nitrogen) under normal atmospheric pressures so long as an infiltration enhancer is present at least at some point during the process.

DESCRIPTION OF COMMONLY OWNED U.S. PATENT APPLICATION

The subject matter of this application is related to that of several other copending and co-owned patent applications. Particularly, these other copending patent applications describe novel methods for making metal matrix composite materials (hereinafter sometimes referred to as "Commonly Owned Metal Matrix Patent Applications").

A novel method of making a metal matrix composite material is disclosed in Commonly Owned U.S. Pat. No. 4,828,008, which issued on May 9, 1989, from U.S. patent application Ser. No. 07/049,171, filed May 13, 1987, in the names of White et al., and entitled "Metal Matrix Composites". According to the method of the White et al. invention, a metal matrix composite is produced by infiltrating a permeable mass of filler material (e.g., a ceramic or a ceramic-coated material) with molten aluminum containing at least 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et. al. invention allows the choice of a balance between infiltration kinetics and nitride formation.

An example of suitable barrier means for use with metal matrix composite formation is described in Commonly Owned U.S. Pat. No. 4,935,055, which issued on Jun. 19, 1990, from U.S. patent application Ser. No. 07/141,642, filed Jan. 7, 1988, in the names of Michael K. Aghajanian et al., and entitled "Method of Making Metal Matrix Composite with the Use of a Barrier". According to the method of this Aghajanian et al. invention, a barrier means (e.g., particulate titanium diboride or a graphite material such as a flexible graphite tape product sold by Union Carbide under the tradename Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and Copending U.S. patent application Ser. No. 07/517,541, filed Apr. 24, 1990, which is a continuation application of U.S. patent application Ser. No. 07/168,284, filed Mar. 15, 1988, in the names of Michael K. Aghajanian and Marc S. Newkirk and entitled "Metal Matrix Composites and Techniques for Making the Same." In accordance with the methods disclosed in this U.S. patent application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

SUMMARY OF THE INVENTION

A metal matrix composite body is produced by spontaneously infiltrating a permeable mass of filler material with matrix metal. Specifically, an infiltration enhancer and/or an infiltration enhancer precursor and/or an infiltrating atmosphere are in communication with the filler material, at least at some point during the process, which permits molten matrix metal to spontaneously infiltrate the filler material. After substantially complete infiltration has been obtained, additional matrix metal (sometimes also referred to herein as a second matrix metal), whether of the same, similar or different composition from the matrix metal which has already infiltrated the filler material, is thereafter added to the infiltrated filler material (e.g., in a preferred embodiment is physically admixed with the infiltrated filler material) to result in a suspension of filler material and matrix metal. Such a suspension has a lower loading of filler material relative to the matrix metal. In an alternative embodiment, an excess of matrix metal is provided, which remains as molten uninfiltrated metal, after spontaneous infiltration is complete. The excess of matrix metal is thereafter stirred or mixed into the infiltrated filler material to form a suspension of filler material and matrix metal having a lower particle loading than the originally spontaneously infiltrated filler material.

In an alternative embodiment, the spontaneously infiltrated metal matrix composite can be allowed to cool after infiltration is complete to form a highly loaded metal matrix composite. The composite can thereafter be reheated to at least its liquidus temperature and a second or additional matrix metal can be admixed therewith.

In a preferred embodiment, a precursor to an infiltration enhancer may be supplied to at least one, or both, of the matrix metal and the filler material. The combination of filler material, matrix metal, supply of infiltration enhancer precursor and infiltrating atmosphere causes the matrix metal to spontaneously infiltrate the filler material.

Moreover, rather than supplying an infiltration enhancer precursor, an infiltration enhancer may be supplied directly to at least one of the filler material, and/or matrix metal, and/or infiltrating atmosphere. Ultimately, at least during the spontaneous infiltration, the infiltration enhancer should be located in at least a portion of the filler material.

The physical admixing of additional matrix metal can be achieved by mechanical stirring means, ultrasonic stirring means, vibrating means, by hand stirring, or by any other suitable means of mixing the infiltrated filler material with additional matrix metal.

Moreover, as stated previously herein, the second or additional matrix metal can have a composition which is smaller to or quite different from the matrix metal which infiltrated the filler material. In the case of utilizing a different second matrix metal, it would be preferable for the first matrix metal which infiltrated the filler material to be at least partially miscible with the second matrix metal to result in an alloying of the first and second matrix metals and/or the formation of intermetallics of the first and second matrix metals. When the second matrix metal is substantially similar to or the same as the first matrix metal which infiltrated the filler material, the two matrix metals are likely to mix quite readily.

After a desirable mixing of the first and second matrix metals has been achieved, the suspension of infiltrated filler material and first and second matrix metals can be allowed to cool, in situ, in the mixing chamber, if desired. The cooled mixture can thereafter be reheated to a temperature at or above the liquidus temperature of the matrix metal in the suspension and thereafter poured into a desired mold. Alternatively, if the mixture is contained within a mold which corresponded to a desired final shape, the mixture can simply be allowed to cool and thereafter be removed from the mold. Still further, the mixture can be maintained in a molten state and poured into a desired mold, which either corresponds to a final metal matrix composite body to be produced or corresponds to some intermediate shape (e.g., an ingot) for subsequent processing.

The resultant metal matrix composite body containing both first and second matrix metals will have a lower volume fraction of filler material relative to a metal matrix composite body which does not contain a second matrix metal therein. Accordingly, the present invention provides a method for producing metal matrix composite bodies having lower volume fractions of filler material. Such lower volume fractions of filler material typically can not be effectively achieved by spontaneously infiltrating a very porous filler material because the maximum amount of porosity that a filler material can exhibit is limited due to such considerations as minimal packing density, preform strength, etc.

It is noted that this application discusses primarily aluminum matrix metals which, at some point during the formation of the metal matrix composite body, are contacted with magnesium, which functions as the infiltration enhancer precursor, in the presence of nitrogen, which functions as the infiltrating atmosphere. Thus, the matrix metal/infiltration enhancer precursor//infiltrating atmosphere system of aluminum/magnesium/nitrogen exhibits spontaneous infiltration. However, other matrix metal/infiltration enhancer precursor/infiltrating atmosphere systems may also behave in a manner similar to the system aluminum/magnesium/nitrogen. For example, similar spontaneous infiltration behavior has been observed in the aluminum/strontium/nitrogen system; the aluminum/zinc/oxygen system;

and the aluminum/calcium/nitrogen system. Accordingly, even though the aluminum/magnesium/nitrogen system is discussed primarily herein, it should be understood that other matrix metal/infiltration enhancer precursor/infiltrating atmosphere systems may behave in a similar manner.

When the matrix metal comprises an aluminum alloy, the aluminum alloy is contacted with a filler material (e.g., alumina or silicon carbide particles). In one embodiment of the invention, the filler material has admixed therewith, or at some point during the process is exposed to, magnesium, as an infiltration enhancer precursor. The aluminum alloy and/or the filler material at some point during the process, and in this preferred embodiment during substantially all of the process, are exposed to a nitrogen atmosphere. In an alternative embodiment, the filler material, and/or the aluminum alloy, and/or the nitrogen infiltrating atmosphere, contain magnesium nitride, as an infiltration enhancer. In either embodiment, the filler material will be spontaneously infiltrated by the matrix metal and the extent or rate of spontaneous infiltration and formation of metal matrix will vary with a given set of process conditions including, for example, the concentration of magnesium provided to the system (e.g., in the aluminum alloy and/or in the filler material and/or in the infiltrating atmosphere), the size and/or composition of the particles comprising the filler material, the concentration of nitrogen in the infiltrating atmosphere, the time permitted for infiltration, and/or the temperature at which infiltration occurs. Spontaneous infiltration typically occurs to an extent sufficient to embed substantially completely the filler material.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal. "Carcass" or "Carcass of Matrix Metal", as used herein, refers to say of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein. "Filler", as used herein, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals. "Highly Loaded Metal Matrix Composite", as used herein, means a metal matrix composite material which has been formed by the spontaneous infiltration of a matrix metal into a filler material and which filler material has not had any substantial amount of second or additional matrix metal added thereto. "Infiltrating Atmosphere", as used herein, means that atmosphere which is present which interacts with the matrix metal and/or preform (or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration. "Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least an portion of the filler material or preform which enhances wetting.

"Low Particle Loading" or "Lower Volume Fraction of Filler Material", as used herein, means that the amount of matrix metal relative to filler material has been increased relative to a filler material which is spontaneously infiltrated without having an additional or second matrix alloy added thereto. "Matrix Metal" or "Matrix Metal Alloy", as used herein , means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials whichs exhibit spontaneous infiltration into a preform or filler material. It should be understood that whenever a "/" appears between an exemplary matrix metal, infiltration enhancer precursor and infiltrating atmosphere, the "/" is used to designate a system or combination of materials which, when combined in a particular manner, exhibits spontaneous infiltration into a preform or filler material.

"Metal Matrix Composite"]or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel). "Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or a filler material (or preform) in a manner which would be significantly detrimental to the spontaneous infiltration mechanism. "Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage. "Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform. "Second Matrix Metal" or "Additional Matrix Metal", as used herein, means that metal which remains or which is added after spontaneous infiltration of the filler material has been completed or substantially completed, and which is admixed with the infiltrated filler material to form a suspension of infiltrated filler material and first and second (or additional) matrix metals, thereby forming a lower volume fraction of filler material, such second or additional matrix metal having a composition which either is exactly the same as, similar to or substantially different from the matrix metal which has previously spontaneously infiltrated the filler material. "Spontaneous Infiltration", as used herein, means the infiltration of matrix metal into the permeable mass of filler or preform occurs without requirement for the application of pressure or vacuum (whether externally applied or internally created). "Suspension of Filler Material and Matrix Metal" or "Suspension", or "Metal Matrix Composite Suspension", as used herein, means the mixture of second or additional matrix metal and filler material which has been spontaneously infiltrated by a first matrix metal.

BRIEF DESCRIPTION OF THE FIGURES

The following figures are provided to assist in understanding the invention, but are not intended to limit the scope of the invention. Similar reference numerals have been used wherever possible in each of the Figures to denote like components, wherein.

DETAILED DESCRIPTION OF THE INVENTION AND PREFERRED EMBODIMENTS

Although high particle loadings (of the order of 40 to 60 volume percent) are obtainable from spontaneous infiltration techniques as disclosed, for example, in commonly owned U.S. Pat. No. 4,828,008, lower particle loadings (of the order of 1 to 40 volume percent) are more difficult, in some cases, to obtain using only such techniques. Specifically, to obtain lower particle loadings with such techniques, preforms or filler material having very high porosity may be required. However, the porosity ultimately obtainable with such filler materials or preforms is limited, such porosity being a function of the perpendicular filler material employed and the size or granularity of the particles used in the preform.

In accordance with the present invention, spontaneous infiltration techniques are utilized to obtain the advantageous properties heretofore associated with spontaneously infiltrated metal matrix composites, yet lower particle loadings are obtainable. A metal matrix composite body is formed by first spontaneously infiltrating a filler material with a first matrix metal in an infiltrating atmosphere and thereafter adding additional or second matrix metal to the infiltrated filler material to result in a suspension of lower volume fraction of filler material and matrix metal. Furthermore, as discussed in detail below, the addition of the additional or second matrix metal enables the process to be tailored to provide a metal matrix of the first matrix metal (i.e., where the first and second matrix metals are the same) or an intermetallic or alloy of the first and second matrix metals (i.e., where the first and second matrix metals are different).

As a first step in the process for obtaining low particle loading metal matrix composites, spontaneous infiltration of a filler material or preform is initiated.

Figure 1A:
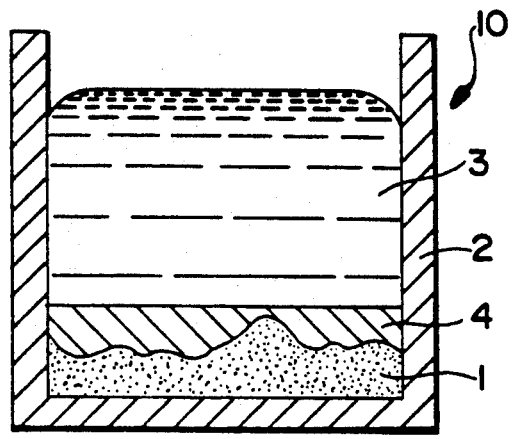
FIG. 1a is a schematic cross-sectional view of a lay-up in accordance with the present invention, illustrating a partially infiltrated composite with excess matrix metal.

With reference to the figures, FIG. 1a illustrates a lay-up (10) which could be used in accordance with the present invention. Specifically, a filler material (or preform) (1) is provided in a mold or container (2), which is substantially non-reactive with the components. A matrix metal (3) is provided, and is heated above its melting point under conditions which enable spontaneous infiltration to occur, as discussed in more detail below. As the matrix metal begins to spontaneously infiltrate the filler material or preform, a metal matrix composite (4) is formed (e.g., if the matrix metal was permitted to cool, at least the portion (4) would comprise a metal matrix composite).

In a first preferred embodiment of the invention, an excess of matrix metal (3) is provided, such that upon completion of spontaneous infiltration, a carcass of uninfiltrated matrix metal remains.

Figure 1B:
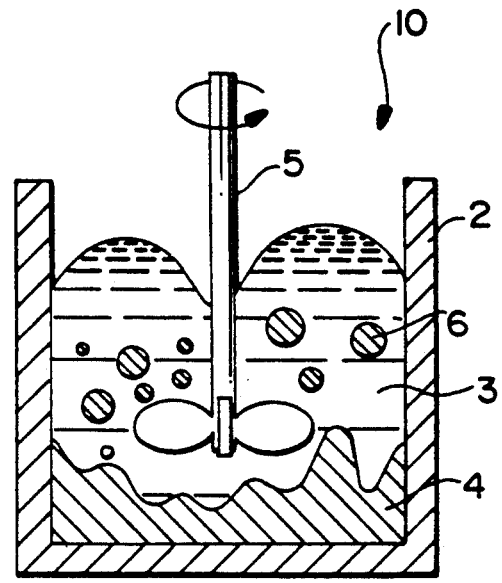
FIG. 1b is a schematic cross-sectional view illustrating the dispersion of an infiltrated composite and excess matrix metal.
Figure 1C:
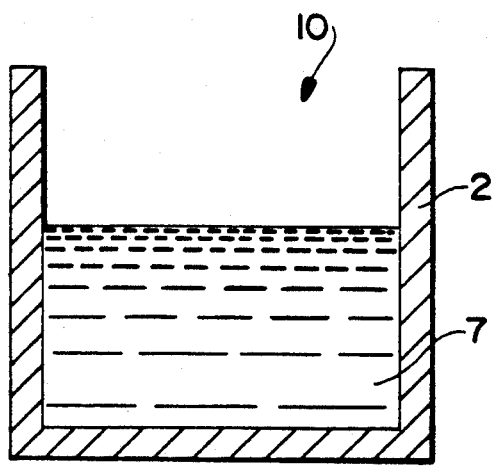
FIG. 1c is a schematic cross-sectional view of the dispersed infiltrated composite before further processing.

As illustrated in FIG. 1b, the matrix metal composite, while still molten, is admixed with excess matrix metal via a stirrer (5), such that the infiltrated filler material is dispersed into the additional matrix metal to form a suspension. Stirrer (5) can be any conventional stirring apparatus, including mechanical stirring means, ultrasonic stirring means or hand stirring. Stirring is continued for 1 to 15 minutes, and preferably for 10 to 15 minutes, or until a homogeneous, fully dispersed mixture (7) is obtained, as illustrated by FIG. 1c.

Stirring should preferably be undertaken at spontaneous infiltration process temperatures (discussed below) to avoid hardening of the composite before dispersion of the mixture is complete. Such stirring could be effected, for example, via overhead stirring means provided in the furnace. Alternatively, if stirring is not performed at process temperatures, procedures should be undertaken to avoid premature cooling, including the use of heated stirring apparatus and well-insulated containment vessels, etc.

Figure 1D:
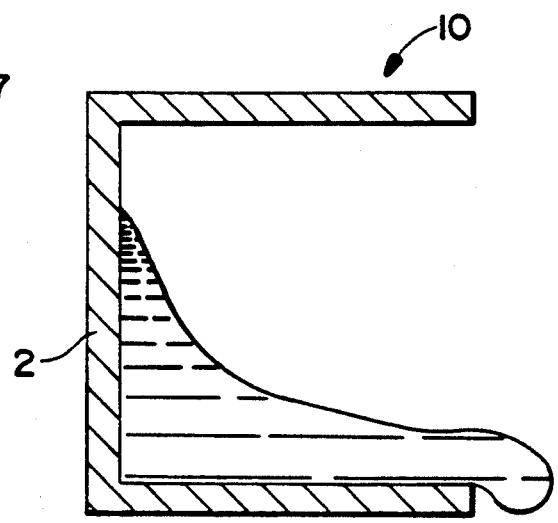
FIG. 1d is a schematic cross-sectional view illustrating the pourability of the dispersed composite.

After complete dispersion is achieved, the dispersed mixture can be poured, as illustrated in FIG. 1d, into a mold to form a body having a lower particle loading than is otherwise obtainable via spontaneous infiltration. Any conventional mold can be used, such as investment shell molds, split shell molds, multiple piece molds, reusable molds, and the like. The molds, preferably, are heated to delay cooling of the dispersed composite to maximize pour times and workability of the poured dispersed composite. Alternatively, room temperature molds or cooled molds, e.g., a copper chill plate, can be utilized if quicker cooling is desired in a particular application.

In an alternative embodiment, the container in which the composite is dispersed corresponds to the ultimate desired shape of the body to be formed. Accordingly, rather than pouring the suspension of filler material and matrix metal, it is allowed to cool in the container, such that the container performs the function of the mold. Alternatively, the suspension can be allowed to cool, and can thereafter be reheated above its melting point and poured or molded for further processing or forming. Moreover, the suspension can be poured into a mold to form an intermediate body, e.g., an ingot, which can thereafter be used as a precursor to further processing.

The resulting composite from the above embodiments exhibits the highly desirable properties associated with other spontaneously infiltrated composites. Moreover, lower particle loadings are obtainable, e.g., of the order of 5 to 40 volume percent, using the dispersion methods of the present invention.

In a further embodiment of the present invention, an excess of matrix metal is not used as in FIG. 1a. Instead, a bed of filler material or a preform is spontaneously infiltrated and allowed to cool to form a highly loaded metal matrix composite. The highly loaded metal matrix composite is thereafter reheated and additional matrix metal is dispersed therein in accordance with the procedures discussed above to create a suspension of filler material and matrix metal, said suspension being capable of forming a low particle loading metal matrix composite (e.g., by a casting method). Alternatively, the additional matrix metal can be added while the matrix metal in the infiltrated composite is still in its liquid state.

The additional or second matrix metal in all of the above embodiments can have a composition which is the same as, similar to or quite different from the matrix metal which spontaneously infiltrates the filler or preform. Through the use of different first and second matrix metals, the resultant three dimensionally interconnected metal matrix of the metal matrix composite can be varied to provide any of a variety of alloys or intermetallics to suit a particular application. As a result, desired chemical, electrical, mechanical and other properties can be tailored to suit a particular application. The second matrix metal is, preferably, a metal which is miscible with the first matrix metal.

The second matrix metal can be introduced in many different ways. With reference to FIG. 1a, matrix metal (3) could be a multi-phase molten alloy having stratified layers comprised at its surface adjacent to the interface with the filler of a first matrix metal, but having at its upper end a second matrix metal. The first matrix metal can be, for example, rich in infiltration enhancer and/or infiltration enhancer precursor and/or secondary alloys which promote infiltration. After the first matrix metal spontaneously infiltrates, the second or additional matrix metal can be admixed to the suspension in accordance with FIG. 1b.

Alternatively, the second or additional matrix metal can be poured in or added in its solid form and liquefied, after spontaneous infiltration has occurred. Moreover, as discussed above, a metal matrix composite can be formed and cooled and, in a subsequent processing step, the composite can be reheated and the second or additional matrix metal can be dispersed into the suspension.

In order to effect spontaneous infiltration of the matrix metal into the preform, an infiltration enhancer should be provided to the spontaneous system. An infiltration enhancer could be formed from an infiltration enhancer precursor which could be provided (1) in the matrix metal; and/or (2) in the preform; and/or (3) from the infiltrating atmosphere; and/or (4) from an external source into the spontaneous system. Moreover, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be located in at least a portion of the filler material.

In a preferred embodiment it is possible that the infiltration enhancer precursor can be at least partially reacted with the infiltrating atmosphere such that infiltration enhancer can be formed in at least a portion of the filler prior to or substantially contiguous with contacting the filler material with the matrix metal (e.g., if magnesium was the infiltration enhancer precursor and nitrogen was the infiltrating atmosphere, the infiltration enhancer could be magnesium nitride which would be located in at least a portion of the filler material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not react with the aluminum matrix metal and/or the filler material when the aluminum is made molten. A filler material can then be contacted with the molten aluminum matrix metal. Under the process conditions, the aluminum matrix metal is induced to infiltrate the filler material spontaneously.

Under the conditions employed in the method of the present invention, in the case of an aluminum/magnesium/nitrogen spontaneous infiltration system, the filler material should be sufficiently permeable to permit the nitrogen-containing gas to penetrate or permeate the molten material at some point during the process and/or contact the molten matrix metal. Moreover, the permeable preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the preform and thereby resulting in spontaneous infiltration. The extent of spontaneous infiltration and formation of the metal matrix composite will vary with a given set of process conditions, including magnesium or magnesium nitride content of the aluminum alloy, magnesium or magnesium nitride content of the filler material, amount of magnesium or magnesium nitride in the filler material, the presence of additional alloying elements (e.g., silicon, iron, copper, manganese, chromium, zinc, and the like), average size of the materials comprising the filler material (e.g., particle diameter) surface condition and type of filler material, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. (Additionally, the auxiliary alloying elements may affect the minimum amount of magnesium required in the matrix aluminum metal to result in spontaneous infiltration of the filler material or preform). Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the preform and matrix metal or the preform alone may result in a reduction in the required amount of magnesium to achieve spontaneous infiltration (discussed in greater detail later herein).

The volume percent of nitrogen in the nitrogen atmosphere also affects formation rates of the metal matrix composite body. Specifically, if less than about 10 volume percent of nitrogen is present in the infiltrating atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 crystolon (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). If the magnesium was applied to a surface of the matrix metal, it may be preferred that said surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler material, also tends to affect the extent of infiltration at a given temperature. Consequently, in some cases where little or no magnesium is contacted directly with the filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower (1) when the magnesium content of the alloy alone is increased, e.g. to at least about 5 weight percent; and/or (2) when alloying constituents are mixed with the permeable mass of filler material; and/or (3) when another element such as zinc or iron is present in the aluminum alloy. The temperature also may vary with different filler materials. In general, spontaneous and progressive infiltration will occur at a process temperature of at least about 675° C., and preferably a process temperature of at least about 750° C.–800° C. Moreover, satisfactory pourability of the resulting suspension, after the second matrix metal has been dispersed, is achievable at or about 800° C. or greater, and possibly lower, depending upon the nature of the suspension. Pourability does not necessarily improve with increased temperatures. Temperatures generally in excess of 1200° C. do not appear to benefit the process, and a particularly useful temperature range has been found to be from about 675° C. to about 1200° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable filler material comes into contact with molten aluminum in the presence of, at least some time during the process, a nitrogen-containing gas. The nitrogen-containing gas may be supplied by maintaining a continuous flow of gas into contact with at least one of the filler material and molten aluminum matrix metal. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product.

For example, when aluminum is the matrix metal, suitable filler materials include (a) oxides, e.g. alumina; (b) carbides, e.g. silicon carbide; (c) borides, e.g. aluminum dodecaboride, and (d) nitrides, e.g. aluminum nitride. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous. Alumina and silicon carbide both provide satisfactory suspensions when a second or additional matrix metal is dispersed therein in accordance with the invention. As discussed in greater detail in the examples, silicon carbide has been found to be more pourable then alumina after dispersion into a suspension.

It also has been discovered that certain filler materials exhibit enhanced infiltration relative to filler materials by having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Commonly Owned U.S. Pat. No. 4,851,375, entitled "Methods of Making Composite Ceramic Articles Having Embedded Filler", which issued on Jul. 25, 1989, in the names of Marc S. Newkirk et al., also exhibit desirable infiltration properties relative to commercially available alumina products. The subject matter of each of the issued Patents is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patents.

The size and shape of the filler material can be any that may be required to achieve the properties desired in the composite. Thus, the material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be needed for complete infiltration of a mass of smaller particles than for larger particles. Further, the mass of filler material (shaped into a preform) to be infiltrated should be permeable (i.e., permeable to molten matrix metal and to the infiltrating atmosphere).

The method of forming metal matrix composites according to the present invention, not being dependent on the use of pressure to force or squeeze molten matrix metal into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with close cell porosity or into a fully dense structure that would prevent infiltration by the molten alloy. Through the dispersion of a second matrix metal in accordance with the present invention, low volume fractions or particle loadings are also obtainable. Accordingly, a wide range of particle loadings can be achieved while still obtaining the processing advantages and properties associated with spontaneous infiltration.

It has been observed that for aluminum infiltration and matrix formation around a ceramic filler, wetting of the ceramic filler by the aluminum matrix metal may be an important part of the infiltration mechanism. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler material, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition than the first source of matrix metal, it is possible to tailor the properties of the metal matrix to meet various operating requirements and thus tailor the properties of the metal matrix composite.

A barrier means may also be utilized in combination with the present invention. Suitable barrier means may be required in the container 2 in which initial infiltration occurs, as well as in any mold into which the dispersed suspension is to be poured. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process as well as being capable of locally inhibiting, stopping, interfering with, preventing, or the like, continued infiltration or any other kind of movement beyond the defined surface boundary of the filler material.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particularly preferred graphite is a graphite tape product that is sold under the trademark Grafoil®, registered to Union Carbide. This graphite tape exhibits sealing characteristics that prevent the migration of molten aluminum alloy beyond the defined surface boundary of the filler material. This graphite tape is also resistant to heat and is chemically inert. Grafoil® graphite material is flexible, compatible, conformable and resilient. It can be made into a variety of shapes to fit any barrier application. However, graphite barrier means may be employed as a slurry or paste or even as a paint film around and on the boundary of the filler material or preform. Grafoil® is particularly preferred because it is in the form of a flexible graphite sheet. In use, this paper-like graphite is simply formed around the filler material or preform.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. The transition metal borides are typically in a particulate form (1-30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatile organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Various demonstrations of the present invention are included in the Examples immediately following. However, these Examples should be considered as being illustrative and should not be construed as limiting the scope of the invention as defined in the appended claims.

EXAMPLE 1-4

The following examples illustrate the spontaneous infiltration of a filler material with a matrix metal, and the subsequent dispersion of additional matrix metal, to obtain a fully dispersed, homogeneous, pourable suspension, having a substantially lower particle loading than the undispersed spontaneously infiltrated composite.

Figure 2:
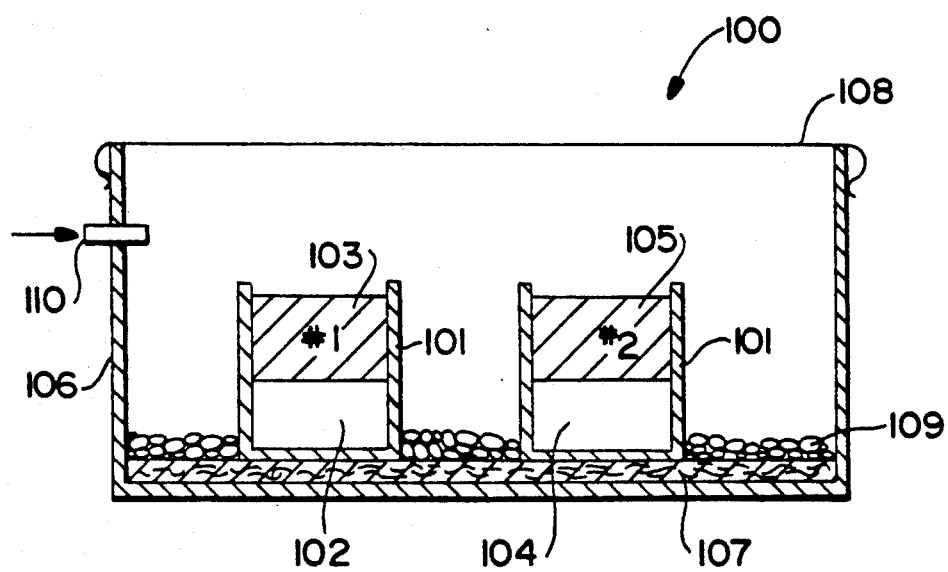
FIG. 2 is a schematic cross-sectional view of the lay-up of Examples 1–4.

FIG. 2 illustrates schematically the lay-up for Examples 1-2. The experiments for Examples 1 and 2 were performed simultaneously and side-by-side. For both of Examples 1 and 2, a 316 stainless steel can (101), 6 inches in diameter and 4.5 inches in height, was lined with Permafoil ®, which functioned as a non-reactive container for spontaneous infiltration.

In Example 1, about 300 g of filler (102) comprised of a mixture of silicon carbide (1000 grit 39 Crystolon from Norton Company) and about 2 percent magnesium (325 mesh) was provided. An ingot (103) of about 600 g of an aluminum alloy containing about 12 weight percent silicon about 5 weight percent zinc and about 6 weight percent magnesium (Al-12Si-5Zn-6 Mg) was placed on top of the filler (102). A layer of 50 mesh magnesium powder was placed at the interface between the filler (102) and the ingot (103).

In Example 2, about 300 g of filler (104) comprised of a mixture of alumina (1000 grit E67 Alundum from Norton Company) and 5 percent magnesium (325 mesh) was provided. An ingot (105) of about 600 g of a standard aluminum 520 alloy (containing 10 percent magnesium) was placed on top of the filler (104). Again, a layer of 50 mesh magnesium was placed at the interface between the filler (104) and the ingot (105).

Both stainless steel containers (101) were placed in a 14 inch long by 8 inch wide by 7 inch high 316 stainless steel can (106), which was covered with copper foil (108). A layer of Fiberfrax ® (107) (McNeil Refractories, Inc.) was placed at the bottom of can (106) to insulate the smaller cans (101) from the bottom of the furnace floor. A titanium sponge (109) was placed along the bottom of the larger can to absorb any oxygen which might enter the system.

A 2:1 ratio (by weight) of matrix metal to filler was utilized in Examples 1 and 2 to ensure that there was an excess of matrix metal, and that a reserve of additional matrix metal would remain after spontaneous infiltration was complete. The 2:1 ratio, after dispersion, was selected to create a 33 percent (by weight) loading of particles to matrix metal.

The lay-up (100) was then placed in a furnace, purged with nitrogen via inlet (110), and heated from room temperature to about 800° C. over a period of about 2 hours under a flow of nitrogen gas at a flow rate of about 2.5 l/min. for approximately 2 hours until spontaneous infiltration was substantially complete.

Cans (101) containing the spontaneously infiltrated composites were thereafter removed from the furnace at 800° C. and stirred immediately by hand in air for 2-3 minutes with an alumina stirring rod, which also had been heated to the furnace temperature.

Both composites mixed well. The resulting suspensions were then poured into a stainless 5 inch by 5 inch steel square frame mold set on a copper chill plate having water circulating therethrough at room temperature (22° C.).

The suspension produced according to Example 1 (the silicon carbide filler) poured well and filled the shape of the mold. The suspension produced according to Example 2 (the alumina filler) poured as a lump, but showed moldable and extrudable characteristics. Both examples demonstrated the applicability of the dispersion method of the present invention to convert unmoldable and unpourable metal matrix composites having particle loadings of the order of 50 percent to a pourable composite having a particle loading of the order of 30 percent.

The experiments of Examples 1 and 2 were identically repeated as Examples 3 and 4, respectively, except that a set-point furnace temperature of 850° C. was used in an attempt to render the composites (e.g., the suspensions) more pourable.

The suspension of Example 3 was harder to stir and pour than then suspension of Example 1. This diminished stirrability and pourability, however, may have been the result of more complete spontaneous infiltration before mixing in Example 3 than in Example 1 resulting in better particle wetting. Example 4 did not show any change in pourability as compared to the alumina filler and matrix suspension of Example 2.

EXAMPLE 5

This Example demonstrates the fabrication of a cast metal matrix composite material in a "two step" process. In a first step, a highly loaded metal matrix composite is prepared by spontaneously infiltrating a matrix metal into a permeable mass of filler material and thereafter solidifying the matrix metal. In the second step, the formed highly loaded metal matrix composite is reheated and dispersed into the melt of a second matrix metal. The assemblies used to carry out these two steps are depicted schematically in FIGS. 3 and 4a–4d, respectively.

Figure 3:
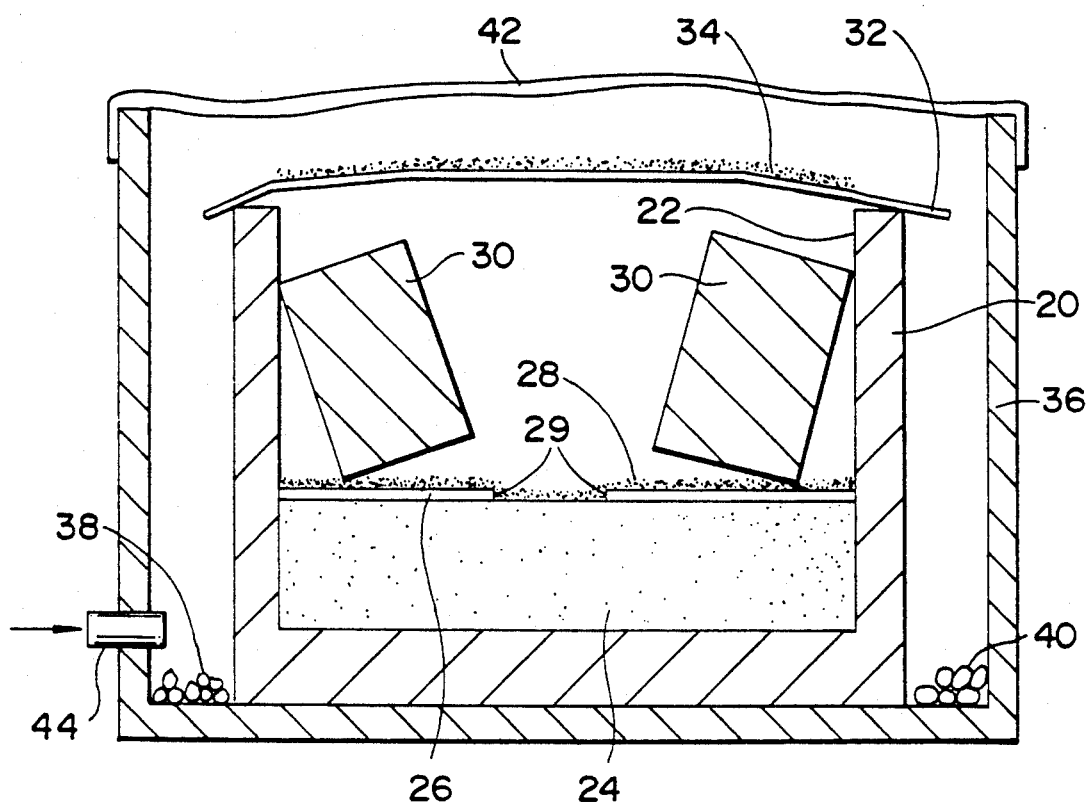
FIG. 3 is a cross-sectional schematic view of a lay-up used to fabricate the highly loaded metal matrix composite body of Example 5.

Specifically, in reference to FIG. 3, a filler material mixture 24 comprising about 702 grams of 39 CRYSTOLON® silicon carbide (1000 grit, Norton Co., Worcester, Mass.), having an average particle size of about 6 microns, and about 23 grams of magnesium powder (−325 mesh, Reade Advanced Materials, Rumson, N.J.) was ball milled for about an hour in an approximately 4 liter porcelain ball mill jar containing about 1450 grams of about 1 inch (25 mm) diameter alumina stones.

A Grade ATJ graphite mold 20 (Union Carbide Corporation, Carbon Products Division, Cleveland, Ohio) measuring about 5 inches (127 mm) long by about 5 inches (127 mm) wide by about 2½ inches (64 mm) high was coated on the interior surfaces with a coloidal graphite aerosol spray 22 (DAG 154, Acheson Colloid Co., Port Huron, Mich.). A total of four coatings of the graphite spray were applied. The coated graphite mold 20 was then placed into an air atmosphere furnace and heated to about 380° C. at a rate of about 400° C. per hour. After holding at about 380° C. for about 2 hours to set the graphite coating, the furnace was allowed to cool naturally. Once the furnace temperature had dropped below 100° C., the coated graphite mold 20 was retrieved from the furnace.

The filler material mixture 24 was poured into the coated graphite mold 20, levelled, and tamped repeatedly to pack the particles more closely together. A GRAFOIL® foil 26 (Union Carbide Corporation, Carbon Products Division, Cleveland, Ohio) measuring about 5.0 inches (127 mm) long by about 5.0 inches (127 mm) wide by about 0.010 inch (0.25 mm) thick and containing a hole 29 measuring about 1.5 inches (38 mm) in diameter was placed on top of the packed filler material mixture 24. Magnesium powder 28 (−50 mesh, Reade Advanced Materials) was sprinkled evenly over the top of the graphite foil 26 and the exposed filler material mixture 24 to a concentration of about 40 milligrams per square inch (6.2 mg/cm$^2$). Several ingots of a first matrix metal 30 comprising by weight about 12 percent silicon and the balance aluminum and collectively weighing about 1550 grams, were placed on top of the graphite foil, and more specifically, around but not on top of the hole in the graphite foil 26, so that when the ingot melted, only fresh metal would come in contact with the filler material mixture 24. The top of the coated graphite mold 20 was covered with a second graphite foil 32, on top of which was sprinkled additional magnesium powder 34 (−50 mesh, Reade Advanced Materials).

The coated graphite mold 20 and its contents were then placed into a stainless steel boat 36 measuring about 11 inches (279 mm) wide by about 12 inches (305 mm) long by about 14 inches (356 mm) high. Magnesium turnings 38 and titanium sponge 40 were also placed on the floor of the stainless steel boat around the outside of the coated graphite mold 20. A copper sheet 42 measuring about 15 inches (38 mm) wide by about 16 inches (406 mm) long by about 15 mils (0.38 mm) thick was placed over the top opening of the boat 36 and folded over the sides of the boat 36 to form an isolated chamber. A purge tube 44 for supplying nitrogen gas to the isolated chamber was provided through the side of the stainless steel boat 36.

The stainless steel boat 36 and its contents were placed into a resistance heated air atmosphere furnace. The furnace door was closed, and a nitrogen flow rate of about 12 liters per minute was established within the stainless steel boat 36 through the purge tube at ambient pressure. The furnace was heated to a temperature of about 535° C. at a rate of about 400° C. per hour, held at 535° C. for about 1 hour, then heated to about 790° C. at about 400° C. per hour, and held at about 790° C. for about 2 hours. During this time, the matrix metal alloy spontaneously infiltrated the filler material mixture to produce a highly loaded metal matrix composite.

The stainless steel boat and its contents were retrieved from the furnace at a temperature of about 790° C. and placed on a refractory plate under a fume hood. The copper foil 42 and top graphite foil 32 were removed and the still-molten carcass of matrix metal 30 was covered with an exothermic hot-topping particulate mixture (Feedol-9, Foseco, Inc., Cleveland, Ohio) to establish a temperature gradient during cooling to directionally solidify the formed highly loaded metal matrix composite. Once a majority of the hot-topping mixture had reacted, the graphite boat and its contents were transferred to a water cooled copper quench plate to maintain the temperature gradient. After cooling to substantially room temperature, the formed metal matrix composite and the carcass of matrix metal were removed from the graphite boat, and the composite was separated from the carcass.

Figure 4A:
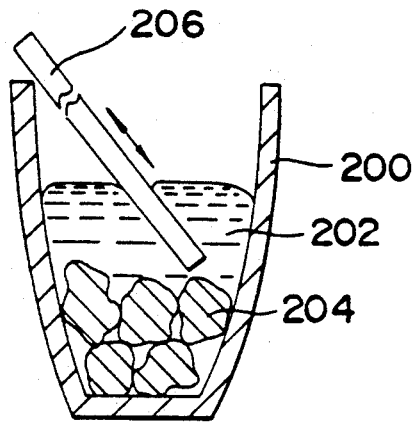
FIG. 4a is a cross-sectional schematic view of which shows the introduction of the highly loaded metal matrix composite material into the melt comprising the second matrix metal contained within a crucible and the crushing of any loosely bound filler material from the highly loaded metal matrix composite.
Figure 4B:
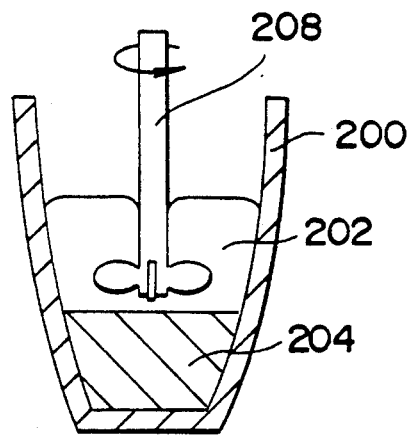
FIG. 4b is a cross-sectional schematic view which shows the introduction of a stirring means into the crucible containing molten first and second matrix metals and the crushed filler material of the highly loaded metal matrix composite material.
Figure 4C:
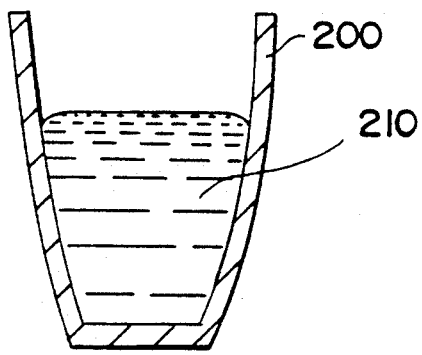
FIG. 4c is a cross-sectional schematic view which shows a formed metal matrix composite suspension.
Figure 4D:
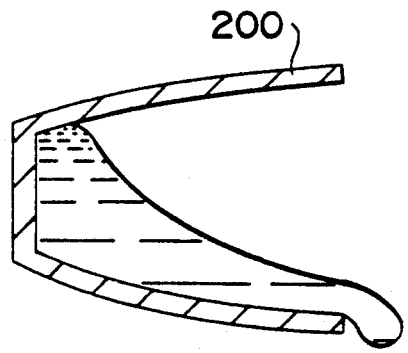
FIG. 4d is a cross-sectional schematic view which shows the pouring of the metal matrix composite suspension from the crucible to form a cast metal matrix composite material.

A second matrix metal ingot 202 weighing about 1419 grams and comprising by weight about 12 percent silicon and the balance aluminum was placed into a silicon carbide crucible 200 having an opening measuring about 6 inches (152 mm) in diameter at the top, 3 inches (76 mm) in diameter at the base, and about 8 inches (203 mm) high. The crucible 200 was then placed into the aforementioned isolated chamber which was fabricated from a sheet of copper foil and a stainless steel can containing a gas inlet tube. The can and its contents were in turn placed into an air atmosphere furnace and heated to about 700° C. at a rate of about 400° C. per hour under flowing nitrogen gas. The furnace atmosphere was changed to air once the furnace had reached about 700° C., as the furnace was opened to remove the copper foil cover on the stainless steel can. Once the metal ingot 202 had melted, the surface dross was scraped off from the metal ingot 202 and two irregularly shaped pieces of highly loaded metal matrix composite material 204, formed as described above, were placed into the melt of the second matrix metal 202. After the matrix metal in the highly loaded metal matrix composites became molten, two more pieces of the highly loaded metal matrix composite material were added and their respective matrix metals melted, for a total addition of about 1556 grams of highly loaded metal matrix composite material. A preheated stainless steel rod 206 coated with colloidal graphite (DAG 154 and measuring about ½ inch (13 mm) in diameter and about 24 inches (610 mm) long was then inserted into the melt and used to crush the highly loaded metal matrix composite material, all of which are shown in FIG. 4a. The coated stainless steel rod 206 was removed from the melt and, as shown in FIG. 4b, a fixture 208 was then placed into the melt, said fixture 208 comprising a 1½ inch (38 mm) diameter stainless steel impeller coated with colloidal graphite (DAG 154, Acheson Colloid Co.) and mounted to a ½ inch (13 mm) diameter, 24 inch (610 mm) long shaft. The fixture 208 was rotated at about 1550 rpm for about 2 minutes by using a lab stirrer (Lab Master T51515 Mechanical Stirrer, Lightnin Mixer Co.) attached thereto (not shown in the figure) and located external to the furnace thereby forming a metal matrix composite suspension 210, shown in FIG. 4c, said suspension 210 comprising the former highly loaded metal matrix composite material now substantially uniformly diluted and filler material therefrom being dispersed throughout the second matrix metal. The impeller fixture 208 was removed from the suspension 210 and the coated stainless steel rod 206 was reinserted into the suspension to confirm that the filler material agglomerates had been sufficiently comminuted and dispersed. The coated stainless steel rod 206 was again removed from the suspension and the metal matrix composite suspension was poured from the crucible 200, as shown in FIG. 4d, and cast into a steel mold (not shown in the figure) coated with colloidal graphite (DAG 154) measuring about 6 inches (152 mm) square by about 2 inches (51 mm) high and which was situated on top of a copper plate. A sheet of CARBORUNDUM ® FIBERFRAX ® ceramic cloth (The Carborundum Company, Niagara Falls, N.Y.) measuring about 8 inches (203 mm) square was placed on top of the mold to insulate the top of the cast metal matrix composite in an effort to achieve directional solidification. After cooling to substantially room temperature, the cast metal matrix composite was removed from the mold.

Subsequent optical microscopy on a polished cross section of the cast metal matrix composite revealed that the process of dispersing the highly loaded metal matrix composite material into a second matrix metal reduced the volume fraction of silicon carbide particulate reinforcement from about 40 volume percent in the highly loaded metal matrix composite ingot to about 20 volume percent in the cast metal matrix composite.

EXAMPLE 6

Figure 5:
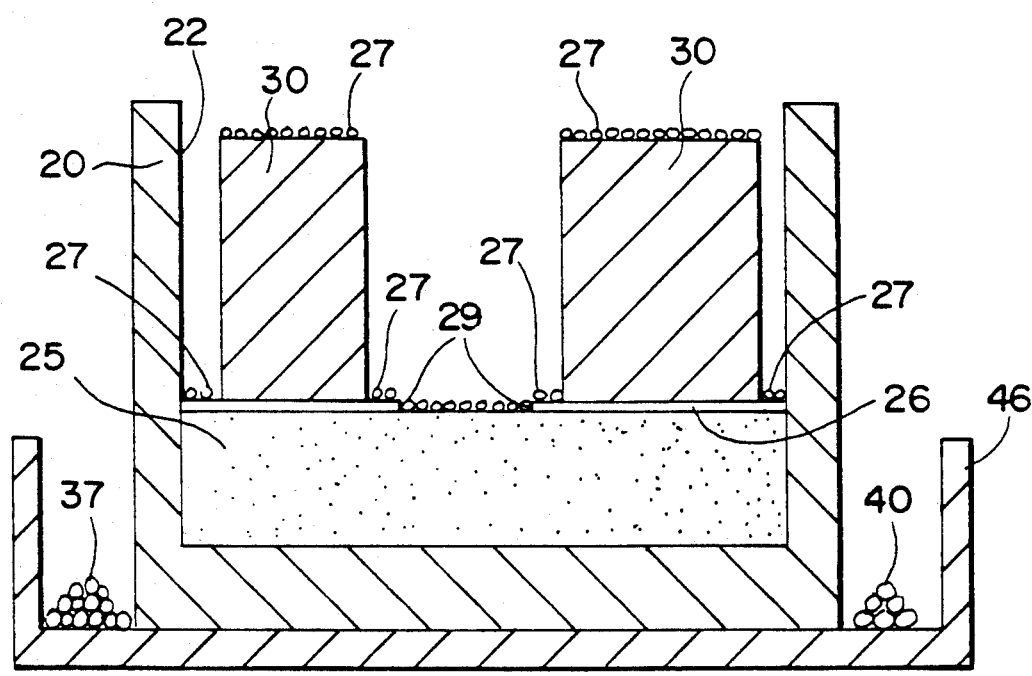
FIG. 5 is a cross-sectional schematic view of a lay-up used to fabricate the highly loaded metal matrix composite of Example 6.

This Example demonstrates that an aluminum metal matrix composite body comprising about 30 volume percent silicon carbide particulate reinforcement can be successfully cast by the methods of the present invention. Some representative physical properties of the cast body are also included in Table I. The setup employed in fabricating the highly loaded metal matrix composite is shown in FIG. 5. The setups employed in dispersing the highly loaded metal matrix composite to form a suspension of filler material and casting the formed suspension of filler material to form a relatively lower loaded metal matrix composite material were substantially the same as those shown in FIGS. 4a through 4d.

In reference to FIG. 5, a filler material mixture 25 comprising about 1500 grams of silicon carbide (500 grit, 39 Crystolon, Norton Co., Worcester, Mass.), having an average particle size of about 17 microns, and about 45 grams of magnesium powder (−325 mesh), Hart Corporation, Tamaqua, Pa.) was ball milled for about an hour in an approximately 8 liter porcelain ball mill jar containing about 3100 grams of about 1 inch (25 mm) diameter alumina stones.

A GRADE ATJ graphite mold 20 (Union Carbide Corporation, Carbon Products Division, Cleveland, Ohio) measuring about 6 inches (152 mm) long by about 6 inches (512 mm) wide by about 2½ inches (64 mm) high in its interior was coated on the interior surfaces with a colloidal graphite aerosol spray 22 (DAG 154, Acheson Colloid Co., Port Huron, Mich.). A total of four coating of colloidal graphite 22 were applied. The coated graphite mold 20 was then placed into an air atmosphere resistance heated furnace and heated to a temperature of about 380° C. at a rate of about 400° C. per hour. After holding at about 380° C. for about 2 hours to set the colloidal graphite coating 22, the furnace was allowed to cool naturally. Once the furnace temperature had dropped below 100° C., the coated graphite mold 20 was retrieved from the furnace.

The filler material mixture 25 was poured into the coated graphite mold 20, levelled, and tamped repeatedly to pack the particles more closely together. A GRAFOIL ® graphite foil 26 (Union Carbide Corporation, Carbon Products Division, Cleveland, Ohio) measuring about 5.0 inches (127 mm) long by about 5.0 inches (127 mm) wide by about 0.10 inch (0.25 mm) thick and containing a hole 29 measuring about 1.5 inches (38 mm) in diameter was placed on top of the packed filler material mixture 25. Magnesium powder 27 (−50 mesh, ground, Hart Corporation, Tamaqua, Pa.) was sprinkled evenly over the exposed filler material mixture 25 to a concentration of about 100 milligrams per square inch (16 mg/cm$^2$). Several ingots of a first matrix metal 30 comprising by weight about 12 percent silicon and the balance aluminum and collectively weighing about 2290 grams were placed on top of the graphite foil 26, around but not on top of the hole in the graphite foil 26, so that when the ingots melted, only fresh metal would come in contact with the filler material mixture 25. The interior of the graphite mold 20 was sprinkled, as shown, with additional magnesium powder 27 (−50 mesh, Hart Corporation) until a concentration of about 16 mg/cm$^2$ was achieved.

The coated graphite mold and its contents were then placed into a stainless steel tray 46 measuring about 10 inches (254 mm) wide by about 12 inches (305 mm) long by about 3 inches (76 mm) high. Aluminum nitride particulate 37 (Advanced Refractory Technologies, Inc. Buffalo, N.Y.) and TI-LOY 97 titanium sponge 40 (Chemalloy Company, Bryn Mawr, Pa.) were placed on the floor of the stainless steel tray 46 around the outside of the graphite mold to gather any residual impurity oxidizing gases which may be present in the retort furnace into which the mold and its contents were to be placed.

The stainless steel tray 46 and its contents were placed into a retort furnace. The furnace door was closed, and a nitrogen flow rate of about 15 liters per minute was established into the retort chamber. The furnace was heated to a temperature of about 225° C. at a rate of about 400° C. per hour, held at about 225° C. for about 12 hours, then heated to about 525° C. at a rate of about 400° C. per hour, held at 525° C. for about 1 hour, then heated to about 780° C. at about 400° C. per hour, and held at about 780° C. for about 3 hours. During this time, the first matrix metal alloy 30 spontaneously infiltrated the filler material mixture 25 to form a highly loaded metal matrix composite.

The stainless steel tray 46 and its contents were removed from the furnace at a temperature of about 780° C. and placed under a fume hood. The graphite boat 20 and its contents were transferred from the stainless steel tray 46 to a copper quench plate. The still-molten carcass of matrix metal 30 was covered with an exothermic hot-topping particulate mixture (Feedol-9, Foseco, Inc., Cleveland, Ohio) designed to establish a temperature gradient during cooling to order to directionally solidify the highly loaded metal matrix composite. After cooling to substantially room temperature, the highly loaded metal matrix composite and the carcass of residual first matrix metal were removed from the graphite boat, and the composite was separated from the carcass. Surface contaminants were removed by sandblasting.

A second matrix metal ingot 202 weighing about 1120 grams and comprising by weight about 12 weight percent silicon and the balance aluminum was placed into a silicon carbide crucible 200 having an opening measuring about 6 inches (152 mm) in diameter at the top, 3 inches (76 mm) in diameter at the base, and about 8 inches (203 mm) tall. The crucible was placed into a controlled atmosphere furnace and heated to about 750° C. at a rate of about 400° C. per hour under flowing argon gas. Once the second matrix metal ingot 202 had melted, the molten second matrix metal 202 was degassed with argon for about one-half hour.

Several blocks of the highly loaded metal matrix composite each measuring about 3 inches (76 mm) square by about 1½ inches (38 mm) thick and weighing a total of about 1510 grams were placed into a second silicon carbide crucible in a separate furnace. The furnace was heated to about 300° C. under an argon gas cover.

A Grade ATJ graphite mold (Union Carbide Corporation) measuring about 6 inches (152 mm) square and about 2 inches (51 mm) deep was placed into a third furnace and heated to a temperature of about 450° C. under an argon gas cover.

When the highly loaded metal matrix composite blocks had reached a temperature of about 300° C., the furnace was opened and the highly loaded metal matrix composite blocks were placed into the second matrix metal melt 202 in the first furnace. After the contents of the crucible had remelted, a preheated stainless steel rod 206 measuring about ½ inch (13 mm) in diameter and about 24 inches (610 mm) long was inserted into the melt and used to crush the composite blocks, as shown in FIG. 4a. The stainless steel rod 206 was removed from the melt and, as shown in FIG. 4b. A fixture 208 was then placed into the melt, said fixture 208 comprising a 1½ inch (38 mm) diameter stainless steel impeller coated with colloidal graphite (DAG 154, Acheson Colloid Co.) and mounted to a ½ inch (13 mm) diameter, 24 inch (610 mm) long shaft. The fixture 208 was rotated at about 1500 rpm for about 3 minutes by using a lab stirrer (Lab Master, Lightnin Mixer Co.) attached thereto (not shown in the figure), which was located external to the furnace. During the stirring operation, the argon gas cover was maintained, but the temperature of the melt dipped to about 685° C. upon initial contact with the fixture 208. The effect of the stirring action was to form a metal matrix composite suspension 210 comprising the former highly loaded metal matrix composite material now substantially uniformly diluted and filler material therefrom being dispersed throughout the second matrix metal. The impeller fixture 208 was removed and the furnace temperature was increased to about 750° C.

The first silicon carbide crucible 200, containing the formed suspension, was removed from the furnace and the metal matrix composite suspension was then poured through a refractory screen (43 mesh, Pyrotek, Inc., Carlisle, Pa.) into a third silicon carbide crucible preheated to a temperature of about 450° C. This third crucible and its contents were then placed back into the first furnace and reheated to a temperature of about 750° C. When a temperature of about 750° C. had been reached, the graphite mold was removed from the approximately 450° C. third furnace and placed onto a copper quench plate. The metal matrix composite suspension in the third crucible was then immediately cast through a refractory screen (55 mesh, Pyrotek, Inc., Carlisle, Pa.) into the graphite mold and allowed to directionally solidify. A sheet of GRAFOIL ® graphite foil (Union Carbide Corporation) measuring about 8 inches (203 mm) square was placed on top of the mold to insulate the top of the casting. After cooling to substantially room temperature, the casting was removed from the mold.

Some physical properties, and the techniques used to measure the physical properties, of the resulting cast metal matrix composite material are discussed in the following paragraphs.

QUANTITATIVE IMAGE ANALYSIS (QIA)

Volume fraction of filler, volume fraction of matrix metal and volume fraction of porosity, were determined by quantitative image analysis. A representative sample of the cast metal matrix composite material was mounted and polished. A polished sample was placed on the stage of a Nikon Microphoto-FX optical microscope with a DAGE-MTI Series 68 video camera manufactured in Michigan City, Ind., attached to the top port. The video camera signal was sent to a Model DV-4400 Scientific Optical Analysis System produced by Lamont Scientific of State College, Pa. At an appropriate magnification, ten video images of the microstructure were acquired through the optical microscope and stored in the Lamont Scientific Optical Analysis System. Video images acquired at 50× to 100×, and in some cases at 200×, were digitally manipulated to even the lighting. Video images acquired at 200× to 1000× required no digital manipulation to even the lighting. Video images with even lighting, specific color and gray level intensity ranges were assigned to specific microstructural features, specific filler material, matrix metal, or porosity, etc.). To verify that the color and intensity assignments were accurate, a comparison was made between a video image with assignments and the originally acquired video image. If discrepancies were noted, corrections were made to the video image assignments with a hand held digitizing pen and a digitizing board. Representative video images with assignments were analyzed automatically by the computer software contained in the Lamont Scientific Optical Analysis System to give area percent filler, area percent matrix metal and area percent porosity, which are substantially the same as volume percents.

MEASUREMENT OF FOUR POINT FLEXURAL STRENGTH

The four point flexural strength of the metal matrix composite material was determined using MIL-STD-1942A, Flexural Strength of High Performance Ceramics at Ambient Temperature. Rectangular flexural strength test specimens having dimensions of about 2 inches (51 mm) long by about 0.24 inch (6 mm) wide by about 0.12 inch (3 mm) thick were used. Test Figure configuration B as outlined in Section 5.2 of MIL-STD-1942A was employed. The four point test fixture was then placed onto the base of Model No. CITS 2000/6 universal testing machine (System Integration Technology, Inc., Stoughton, Mass.) having a 500 lb (2225N)

full scale deflection load cell. A computer data acquisition system was connected to the measuring unit and strain gauges in the load cell recorded the test responses. The flexural strength test specimens were deformed at a constant cross-head travel rate of about 0.51 millimeters per minute. The flexural strength and the maximum strain to failure were calculated from the sample geometry and recorded responses with programs from within the computer.

MEASUREMENT OF ULTIMATE TENSILE STRENGTH (U.T.S.)

Figure 6:
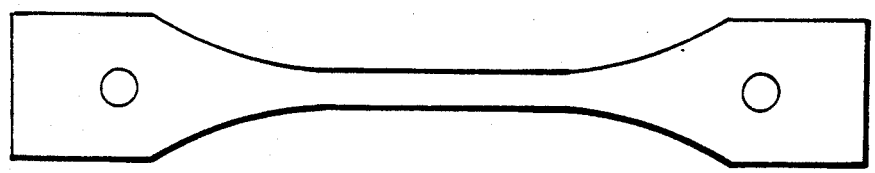
FIG. 6 shows the geometry of the pin-loaded tensile bar used to measure the tensile strength of the cast metal matrix composite body of Example 6.

The tensile strength was determined using ASTM #B557-84 "Standard Methods of Tension Testing Wrought and Cast Aluminum and Magnesium Products". The geometry of the pin-loaded tensile bar is shown in FIG. 6. The strain of the pin-loaded tension test specimen was measured with strain gauges (350 ohm bridges) designated CEA-06-375UW-350 from Micromeasurements of Raleigh, N.C. The tensile test bar was placed into the gripping fixture on a Syntec 5000 pound (2269 kg) load cell (Universal Testing Machine, Model No. CITS 2000/6 manufactured by System Integration Technology Inc., of Straton, Mass.). A computer data acquisition system was connected to the measuring unit, and the strain gauges recorded the test responses. The test specimen was deformed at a constant rate of 0.020 inches/minute (0.508 mm/minute) to failure. The maximum stress, maximum strain and strain to failure were calculated from the sample geometry and recorded responses with programs within the computer.

MEASUREMENT OF MODULUS BY THE RESONANCE METHOD

The elastic modulus of the metal matrix composite was determined by a sonic resonance technique which is substantially the same as ASTM method C848-88. Specifically, a composite sample measuring from about 1.8 to 2.2 inches long, about 0.24 inches wide and about 1.9 inches thick (about 45 mm to about 55 mm long, about 6 mm wide and about 4.8 mm thick) was placed between two transducers isolated from room vibrations by an air table supporting a granite stone. One of the transducers was used to excite frequencies within the composite sample while the other was used to monitor the frequency response of the metal matrix composite. By scanning through frequencies, monitoring and recording the response levels for each frequency and noting the resonant frequency, the elastic modulus was determined.

MEASUREMENT OF THE FRACTURE TOUGHNESS FOR METAL MATRIX COMPOSITE USING A CHEVRON NOTCH SPECIMEN

The method of Munz, Shannon and Bubsey, was used to determine the fracture toughness of metal matrix composite. The fracture toughness was calculated from the maximum load of Chevron notch specimen in four point loading. Specifically, the geometry of the Chevron notch specimen was about 1.8 to 2.2 inches (45 to 55 mm) long, about 0.19 inches (4.8 mm) wide and about 0.24 inches (6 mm) high. A Chevron notch was cut with a diamond saw to propagate a crack through the sample. The Chevron notched samples, the apex of the Chevron pointing down, were placed into a fixture within a Universal test machine. The notch of the Chevron notch sample, was placed between two pins 1.6 inches (40 mm) apart and approximately 0.79 inch (20 mm) from each pin. The top side of the Chevron notch sample was contacted by two pins 0.79 inch (20 mm) apart and approximately 0.39 inch (10 mm) from the notch. The maximum load measurements were made with a Sintec Model CITS-2000/6 Universal Testing Machine manufactured by System Integration Technology Incorporated of Straton, Mass. A cross-head speed of 0.02 inches/minute (0.58 millimeters/minute) was used. The load cell of the Universal testing machine was interfaced to a computer data acquisition system. Chevron notch sample geometry and maximum load were used to calculate the fracture toughness of the material. Several samples were used to determine an average fracture toughness for a given material.

MEASUREMENT OF INDENTATION HARDNESS

Hardness was measured on the Rockwell A scale of an indentation-type hardness tester (Leco Corp. St. Joseph, Mo.).

MEASUREMENT OF ABRASION RESISTANCE (LOSS OF MATERIAL)

Abrasion resistance was measured in accordance with the procedure specified in ASTM Test G65-81 "Standard Practice for Conducting Dry Sand/Rubber Wheel Abrasion Tests". The specific test machine was a universal Model 4850 abrasion tester (George Fischer Foundry Systems, Inc., Holly, Mich.).

MEASUREMENT OF APPARENT DENSITY

The apparent density of a sample is measured by first insuring that the sample is completely dry. The mass of the sample is determined as accurately as possible. The sample is then placed into the sample chamber of an AccuPyc 1330 Autopycnometer (Micromeritics, Inc., Norcross, Ga.). The autopycnometer automatically calculates the apparent volume of the sample. Apparent density is found by simply dividing the apparent volume into the mass.

MEASUREMENT OF THERMAL EXPANSION COEFFICIENT

The thermal expansion coefficient was measured using an Adamel DI-24 Lhomargy Dilatometer in accordance with the procedure set forth in ASTM Test E228-85 "Standard Test Method for Linear Thermal Expansion of Solid Materials with a Silica Dilatometer." Specifically, a test specimen measuring no longer than 51 mm nor shorter than 9 mm in length, smaller than 10 mm in cross section, and having parallel ends was placed on an alumina support. An alumina rod which contacted both the linear voltage differential transducer (LVDT) and the sample similarly replaced the silica rod described in the ASTM test procedure.

TABLE I

| Room Temperature Properties of a Metal Matrix Composite Material Made in Accordance with Example 6 | |
|---|---|
| Quantitative Image Analysis Volume Percent SiC | 28–32 |
| Four Point Flexural Strength | 286 ± 27 MPa |
| Ultimate Tensile Strength | 173 ± 21 MPa |
| Fracture Toughness ($K_{1c}$) | 12.0 ± 0.5 MPa m$^{\frac{1}{2}}$ |
| Elastic Modulus (resonance method) | 120–124 GPa |
| Thermal Expansion Coefficient | 14.0 ppm/K |
| Apparent Density | 2.78 g/cm$^3$ |

TABLE I-continued

Room Temperature Properties of a Metal Matrix Composite Material Made in Accordance with Example 6

| | |
|---|---|
| Indentation Hardness | 38–40 $R_A$ |
| Abrasion Resistance (Loss of Material) (dry sand rubber wheel test) | 0.29 cm$^3$ |

EXAMPLE 7

This Example demonstrates the fabrication of a shaped metal matrix composite material by casting a suspension of filler material and matrix metal into an investment shell mold.

Figure 7:
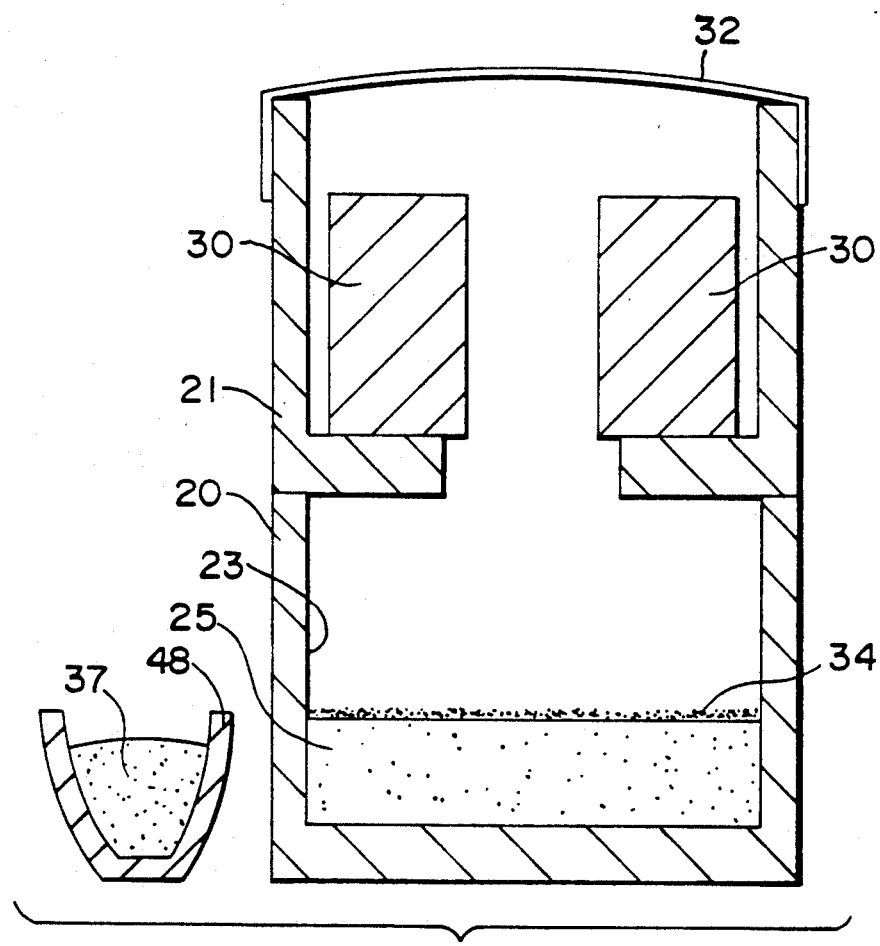
FIG. 7 is a cross-sectional schematic view of a lay-up used to fabricate the highly loaded metal matrix composite of Example 7.

To fabricate the shaped metal matrix composite body, a highly loaded metal matrix composite body was first fabricated. The setup employed in making the highly loaded metal matrix composite body is shown in FIG. 7. Specifically, about 1500 grams of a filler material mixture 25 comprising by weight about 3.0% magnesium particulate (−325 mesh, Hart Corporation, Tamaqua, Pa.) and the balance 500 grit 39 CRYSTOLON® green silicon carbide particulate (Norton Company, Worcester, Mass.) having an average particle size of about 17 microns, was placed into a porcelain ball mill having a capacity of about 8.3 liters (U.S. Stoneware Corporation, Mahwah N.J.). About 4,000 grams of alumina based milling media, each having a diameter of about 1.0 inch (25 mm) was placed into the ball mill. The filler material mixture was ball milled for about 2 hours, and then poured into a graphite boat 20 having a wall thickness of about ¼ inch (6 mm) to ½ square by about 4.0 inches (102 mm) deep. The interior of the graphite boat had previously been aerosol spray-coated with about four (4) thin coats of AERODAG® colloidal graphite 23 (Acheson Colloids Company, Port Huron, Mich.) and then had been dried at a temperature of about 380° C. in air for about 2 hours.

The graphite boat 20 and its contents were then placed into a vacuum drying oven and held at a temperature of about 225° C. for about 12 hours to remove any residual moisture from the ball milled filler material 25. The graphite boat 20 was then shaken to level the filler material contained within and then tapped gently several times to pack the filler material particles more closely together. A layer of magnesium particulate 34 (−325 mesh, Hart Company, Tamaqua, Pa.) was then sprinkled substantially evenly over the top surface of the filler material 25 until a concentration of about 0.1 gram per square inch (16 mg/c$^2$) had been achieved.

Several ingots of a matrix metal 30 comprising by weight about 12.0% silicon and the balance aluminum, and totaling about 2,286 grams in mass, were placed into a second graphite boat 21 whose interior measured about 6½ inches (165 mm) square by about 4.0 inches (102 mm) deep and whose wall thickness measured about ¼ (6 mm) to ½ (13 mm) inch thick. This second graphite boat 21 also featured an approximately 2.0 inch (51 mm) diameter hole in the base. The top opening of this second graphite boat 21 was covered loosely with a sheet of GRAFOIL® graphite foil 32 (Union Carbide Company, Carbon Products Division, Cleveland, Ohio) whose edges were folded down over the sides of the second graphite boat 21. The second graphite boat 21 and its contents were then placed directly atop the first graphite boat 20 and its contents and both were placed into a retort furnace. About 30 grams of aluminum nitride particulate 37 (Advanced Refractory Technologies, Inc., Buffalo, N.Y.) was placed into a refractory crucible 48 which in turn was placed into the retort furnace adjacent to the stacked graphite boats 20, 21 to help gather residual oxidizing gases from the retort atmosphere.

The retort was sealed and the retort atmosphere was then evacuated using a mechanical roughing pump. The retort was then backfilled with nitrogen gas to approximately atmospheric pressure. A nitrogen gas flow rate through the retort of about 15 liters per minute was established and maintained. The furnace was then heated from about room temperature to a temperature of about 225° C. at a rate of about 400° C. per hour. After maintaining a temperature of about 225° C., again at a rate of about 400° C. per hour. After maintaining a temperature of about 525° C. for about 1 hour, the temperature was then further increased to about 780° C. again at a rate of about 400° C. per hour. After maintaining a temperature of about 780° C. for about 3 hours, the retort chamber was opened and the stacked graphite boats 20, 21 were removed to reveal that the matrix metal 30 had melted and spilled through the hole in the base of the upper graphite boat 21 onto the filler material 35 in the bottom graphite boat 20 and the matrix metal 30 had spontaneously infiltrated the filler material 25 to form a highly loaded metal matrix composite. The second graphite boat 21 was removed from the first graphite boat 20 and the first graphite boat 20 containing the formed highly loaded metal matrix composite was placed onto a chill plate to effect directional solidification of the metal matrix composite body contained within. The exposed surface of the metal matrix composite body was covered with a sufficient amount of FEEDOL® No. 9 hot topping particulate mixture (Foseco, Inc., Cleveland, Ohio) to assist in maintaining the temperature gradient during directional solidification. Upon cooling to about room temperature, the highly loaded metal matrix composite body was removed from the graphite boat 20 and was surface cleaned by grit blasting.

Next, the volume fraction of silicon carbide reinforcement in the highly loaded metal matrix composite was reduced by forming a suspension of filler material in a matrix metal. Specifically, the suspension of filler material was formed by melting about 850 grams of a matrix metal comprising by weight about 12.0% silicon, 0.03% strontium, and the balance aluminum in a graphite crucible under an argon gas atmosphere at a temperature of about 750° C. The highly loaded metal matrix composite discussed above was cut into several smaller blocks using a diamond saw. A number of blocks of the highly loaded metal matrix composite were placed into a second graphite crucible until a total of about 1,250 grams of highly loaded metal matrix composite material were positioned in the crucible. This second graphite crucible and its contents was then heated to a temperature of about 300° C. The preheated highly loaded metal matrix composite blocks were then added one at a time to the molten matrix metal over a period of about 1½ hours. The matrix metal and the added highly loaded metal matrix composite blocks were allowed to equilibriate at a temperature of about 750° C. for about ½ hour after the last block had been added to the matrix metal. The equilibriated mixture was then stirred for about 5 minutes at a speed of about 2000 rpm using a Lab Master T51515 Mechanical Stirrer which was the same as that discussed in Example 5. After this stirring operation, a suspension comprising molten metal matrix composite and a reduced volume fraction of silicon carbide reinforcement was ready to be cast into preheated investment shells.

A refractory investment shell mold defining the shape for the cast metal matrix composite was fabricated as described below.

Figure 8A:
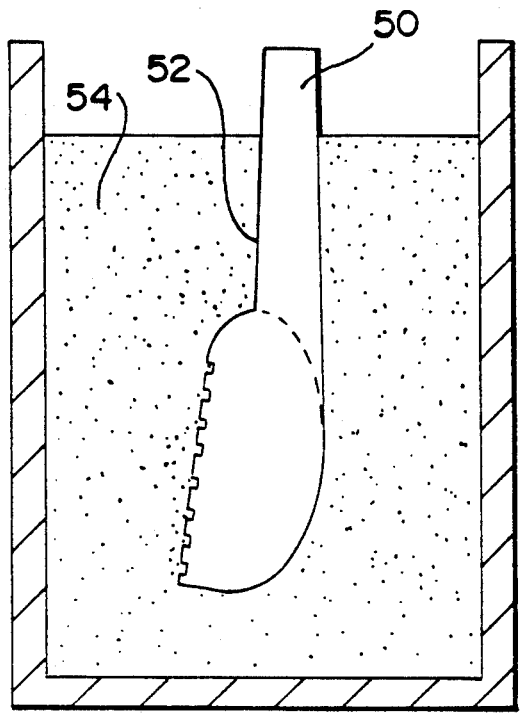
FIGS. 8a–8e show schematically the process sequence for fabricating the metal matrix composite body of Example 7.
Figure 8B:
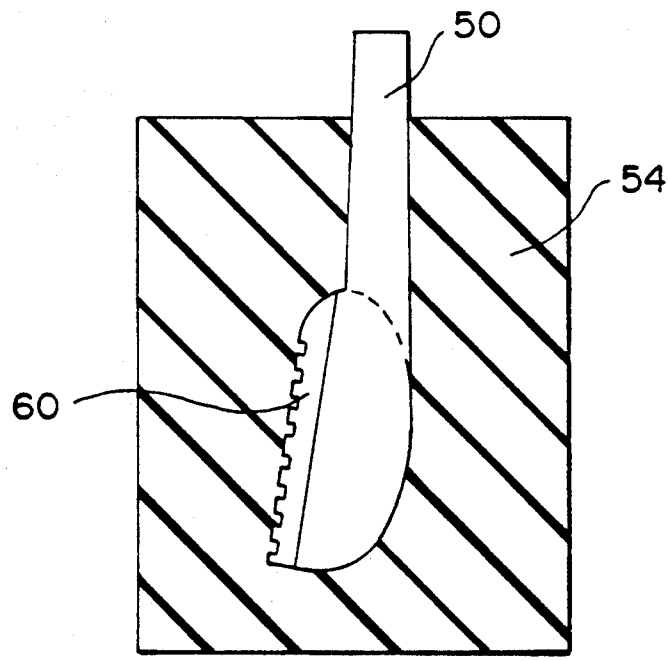

In reference to FIG. 8a, a commercially available metal golf club head 50 was first spray coated with Grade MS-122 fluorocarbon release agent dry lubricant 52 (Miller-Stevenson, Inc., Danbury, Conn.). GI-1000 rubber molding compound 54 (Plastic Tooling Supply Company, Exton, Pa.) was then cast around the spray-coated golf club head 50 to form a first rubber mold 54 inversely replicating the shape of the golf club head 50. After curing the rubber molding compound 54 in air for about 12 hours, the spray-coated golf club head 50 was separated from the first rubber mold 54. The insert portion of the metal golf club head 50 which was to be replicated with a cast metal matrix composite material was then electro-discharge machined from the as-received metal golf club head to leave behind a cavity 60 in the golf club head 50 of the desired shape. The hollowed-out golf club head was then placed back into the first rubber mold 54, as shown in FIG. 8b, and a polyurethane based polymer material (C-1511 isocyanate urethane casting resin, Smooth-On, inc., Gillette, N.J.) comprising by weight and about 50 percent catalyst and the balance resin was cast into the cavity 60 of the golf club head 50 within the first rubber mold 54. After the cast polyurethane material had cured and hardened, the contents of the first rubber mold 54 were disassembled to reveal that the cast polyurethane material had formed an accurate positive model of the desired golf club head insert, as represented by the reference numeral 58 in FIG. 8c.

Figure 8C:
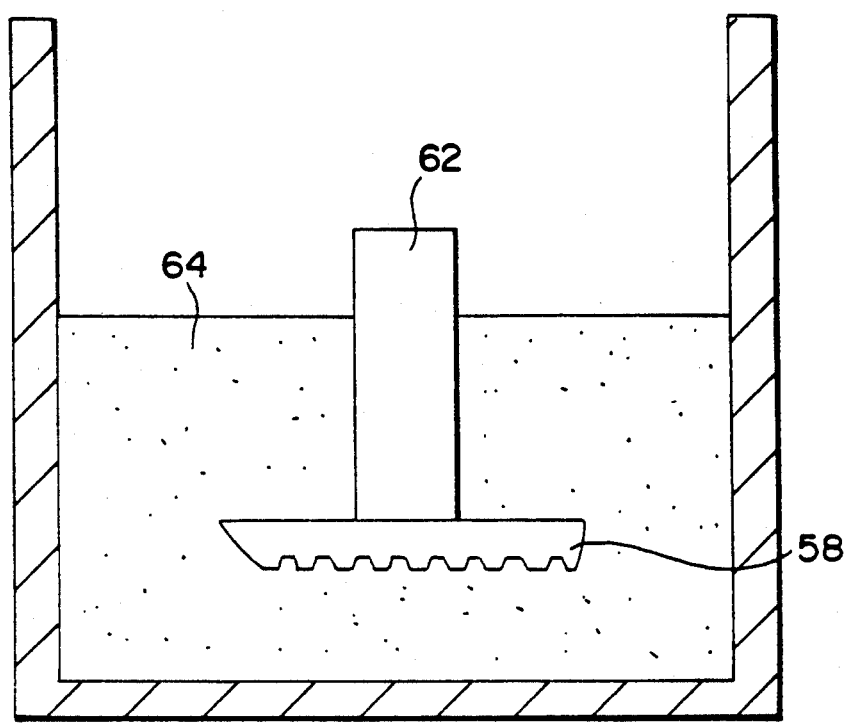
Figure 8D:
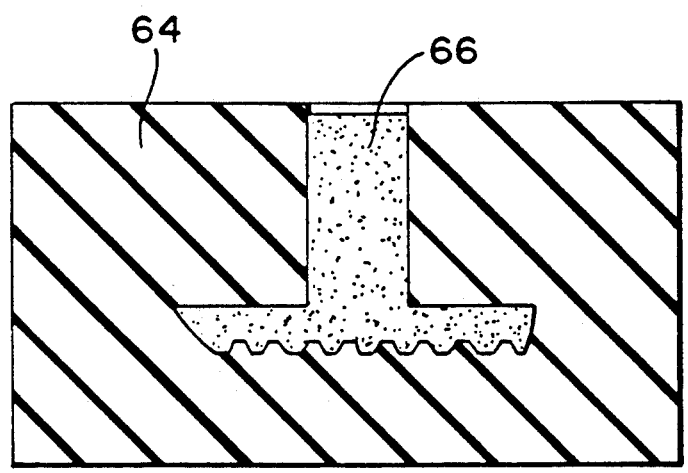
Figure 8E:
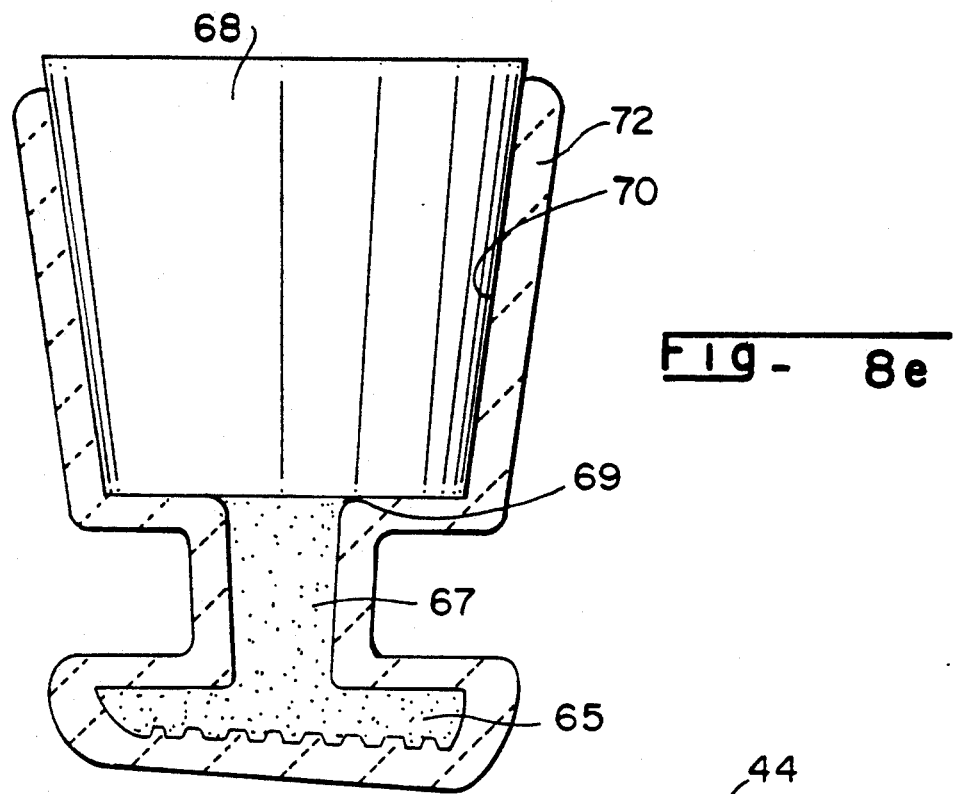

As shown in FIG. 8c, was spur 62 was attached to the polyurethane golf club insert 58 and a second rubber mold 64 was cast around the insert 58 and the wax spur 62 to form a negative image thereof. The role of the wax spur 62 was to form the gate or riser portion of the subsequently formed investment shell cavity. After curing the rubber molding compound in substantially the same manner as was described above, the polyurethane insert 58 and the wax spur 62 were removed from the second rubber mold 64 and a positive image wax pattern of the golf club head insert and its attached gate section was then made by casting Grade 5550-K. GRN. FLK. molten was 66 (shown in FIG. 8d) (Yates Manufacturing Company, Chicago, Ill.) at a temperature of about 110° C. into the cavity in the second rubber mold 64. As shown in FIG. 8e, after the wax 66 had cooled to about room temperature the wax model 65 and its attached gate section 67 were then removed from the rubber mold 64. The wax model 65 of the golf club head insert and the attached gate section 67 were then attached using molten wax to a styrofoam cup 68 which had been coated with wax 70 to form an investment pattern. The shape of the styrofoam cup 68 would later form the reservoir portion of the investment shell to be cast around the wax model 65, gate section 67, and cup 68.

An investment shell 72 was then built up on the surface of the investment pattern. Specifically, the investment pattern comprising the wax model 65, gate section 67 and styrofoam cup 68 were dipped into a slurry comprising about 29.6 % by weight NYACOL ® 1430AT colloidal silica (Nyacol Products, Inc., an affiliate of PQ Corporation, Ashland, Mass.), about 65.1% HUBERCARB ® Q 325 calcium carbonate (−325 mesh, JM Huber Corporation, Calcium Carbonate Division, Quincy, Ill.) having substantially all particles smaller than about 45 microns in diameter, about 4.3 % 500 grit (average particle diameter of about 17 microns) 39 CRYSTOLON ® green silicon carbide particulate (Norton Company, Worcester, Mass.), about 0.6% VICTOWET ® 12 wetting agent (Ransom and Randolph, Inc., Maumee, Ohio), and about 0.3% DCH ANTIFOAM ® defoamer (Ransom and Randolph, Inc., Maumee, Ohio). The coated model was then dusted or stuccoed with dry 90 grit RANCO ® SIL No. 4 silica sand (Ransom and Randolph, Inc., Maumee, Ohio). The wax model 65 and its developing investment shell 72 were then dried for about ½ hour at a temperature of about 65° C. The dried investment shell was then dipped for about 2 seconds into a bath of NYACOL ® 1430AT colloidal silica (Nyacol Products, Inc., Ashland, Mass.). This dip-dust-dry-wet sequence was then immediately repeated two more times. Next, the coated investment pattern was immediately dipped into a secondary slurry comprising by weight about 1 part REDIP ® indicator (Ransom and Randolph, Inc., Maumee, Ohio), about 2 parts VICTOWET ® 12 wetting agent (Ransom and Randolph, Inc., Maumee, Ohio), about 56 parts distilled water, and about 274 parts NYACOL ® 830 colloidal silica (Nyacol Products, Inc., Ashland, Mass.), and about 700 parts RANCO ® SIL No. 2 silica powder (Ransom and Randolph, Inc., Maumee, Ohio) to yield a slurry viscosity corresponding to about 15 seconds in a Zahn No. 4 cup. The slurry investment shell was then stuccoed or dipped into a fluidized bed of approximately 30 grit RANCO ® SIL B silica sand (Ransom and Randolph, Inc., Maumee, Ohio). The stuccoed investment shell was again dried at a temperature of about 65° C. for about ½ hour or until the REDIP ® indicator in the shell changed in color from yellow/green to deep orange. This second dip-stucco-dry sequence was then repeated an additional five (5) times. No prewetting of the investment shell with colloidal silica between dippings in the secondary investment shell slurry was required. After application of the third secondary shell layer, the developing shell was wrapped with wire which served as a reinforcement. Several 1/16 inch (1.6 mm) diameter holes were drilled in the investment shell in strategic places to assist in venting gases from the wax during the subsequent autoclaving.

The coated investment pattern was then placed into a steam autoclave to remove the wax 66 from the surrounding investment shell. After autoclaving at a temperature of about 300° F. and a pressure of about 100 psi (690 kPa) for about 4 minutes substantially all of the wax 66 had been removed from the surrounding investment shell 72. The investment shell 72 was then removed from the steam autoclave and placed into a resistance heated air atmosphere furnace at a about room temperature. The furnace was then heated to a temperature of about 900° C. at a rate of about 800° C. per hour. After maintaining a temperature of about 900° C. for about 1 hour, the styrofoam had combusted; any residual, impurity oxidizing vapors had outgassed and the investment shell 72 had rigidized (e.g., some sintering occurred). Accordingly, the furnace temperature was decreased to a temperature of about 750° C. The furnace was maintained at this temperature until the rigidized investment shell 72 was ready to be used in the pressureless metal infiltration process.

When the formed metal matrix composite suspension discussed above was ready to be cast into the investment shell 72, the investment shell 72 was removed from the approximately 750° C. air atmosphere furnace, and was placed onto a refractory plate. After the metal matrix composite suspension had been adequately stirred, the mixture was immediately poured into the investment shell 72 up to approximately the level indicated by the numeral 69 (shown in FIG. 8e) in the gate section of the investment shell. The gate section of the investment shell corresponds to the region of the shell which at one point housed the wax spur portion of the investment pattern (i.e., the portion 67 shown in FIG. 8e). The remaining volume in the investment shell was filled or topped off with pure molten matrix metal at a temperature of about 750° C. (i.e., matrix metal containing no ceramic reinforcement) comprising by weight about 12.0% silicon, about 0.03% strontium, and the balance aluminum. The investment shell and its contents comprising the metal matrix composite suspension was then placed back into the approximately 750° C. nitrogen atmosphere furnace for about 15 minutes. The investment shell and its contents were then removed from the furnace and directional solidification of the molten matrix metal contained within was commenced. Specifically, air was blown around the base of the investment shell while the exposed surface of the matrix metal was covered with a hot topping particulate mixture (FEEDOL ® No. 9, Foseco, Inc., Cleveland, Ohio) to help maintain the temperature gradient during solidification. After the investment shell and its contents had cooled to about room temperature, the investment shell was removed with light hammer blows to recover the cast metal matrix composite golf club head insert and its attached gate section and reservoir. The attached gate section and reservoir were removed using a diamond saw and the outside face of the cast metal matrix composite was lightly diamond machined to restore the corresponding detail of the metal original portion of the golf club head.

Figure 9:
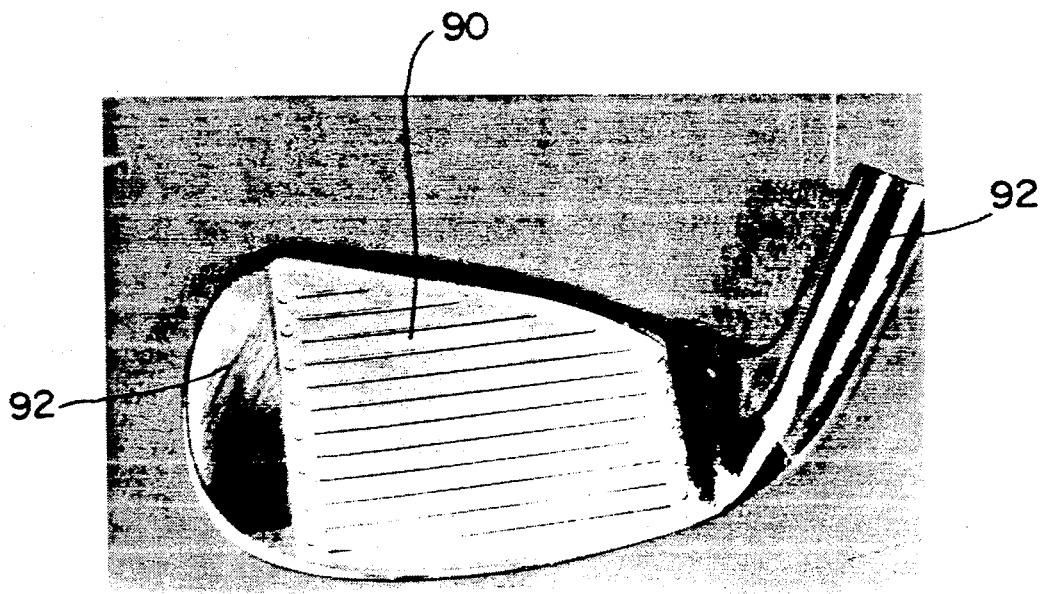
FIG. 9 is a photograph of a golf club head comprising a metal body and a cast metal matrix composite insert.

FIG. 9 shows the finished cast metal matrix composite 90 as mounted in the modified metal golf club head body 92.

EXAMPLE 8

This Example demonstrates utilizing the techniques of the present invention on a larger scale than the Examples previously described. Moreover, this Example also demonstrates the fabrication of a cast metal matrix composite body by a metal matrix composite casting method wherein the second matrix metal has a different chemical composition than the first matrix metal.

Figure 10:
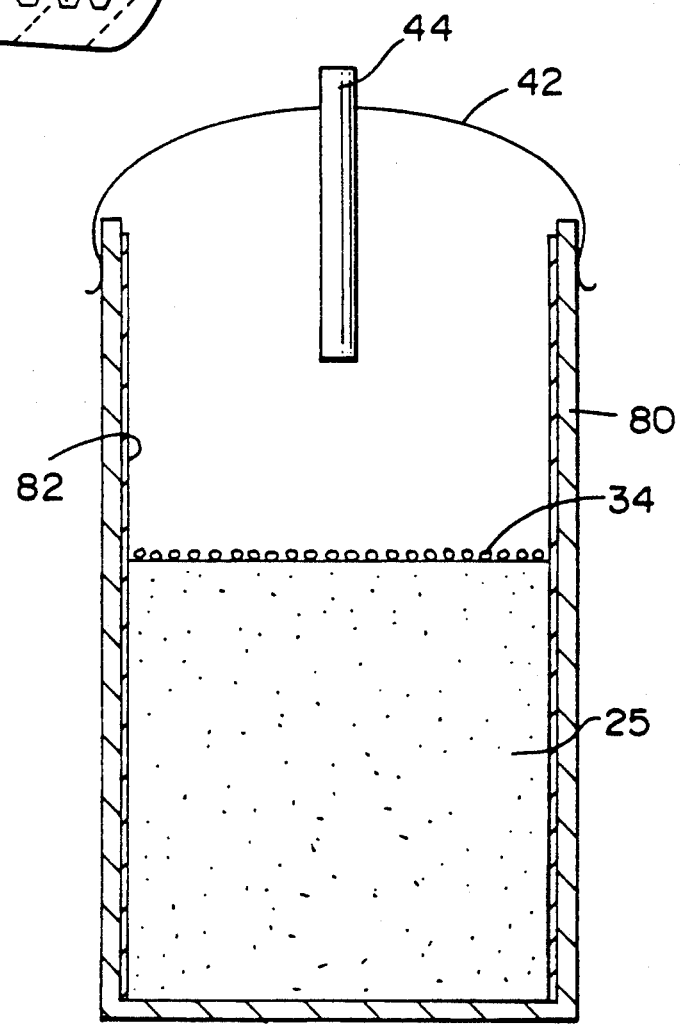
FIG. 10 is a cross-sectional schematic view of a lay-up used to fabricate the highly loaded metal matrix composite of Example 8.

A highly loaded metal matrix composite was fabricated as follows and as shown in FIG. 10. A 500 grit silicon carbide particulate filler material (39 CRYSTOLON ®, Norton Company, Worcester, Mass.) was admixed with a magnesium particulate (−325 mesh, Hart Corporation, Tamaqua, Pa.) in substantially the same manner and in substantially the same proportions as was described in Example 6. The admixed silicon carbide and magnesium particulates formed a mixture 25, which was vacuum dried for about 24 hours at a temperature of about 225° C.

The vessel 80 used for housing the filler material 25 and matrix metal during fabrication of the highly loaded metal matrix composite comprised a steel tube measuring about 5½ inches (140 mm) in diameter by about 3 feet (0.9 meters) long. The steel tube 80 was closed on one end and was lined on its interior surface with about 3 layers of GRAFOIL ® graphite foil 82 (Union Carbide Company, Carbon Products Division, Cleveland, Ohio). About 25 lbs. (11.35 kilograms) of the admixed filler material 25 was poured into the lined steel vessel 80, levelled and settled. Additional magnesium particulate 34 (−325 mesh, Hart Corporation) was then sprinkled evenly over the top surface of the filler material 25 until a concentration of about 16 milligrams per square centimeter of magnesium particulate was achieved.

The steel vessel 80 and its contents were then placed into a resistance heated air atmosphere furnace at about room temperature. A nitrogen gas purge tube 44 was supplied to the interior of the steel vessel 80 terminating near the opening at the top of the vessel 80. Copper sheet 42 was then placed around the purge tube 44 and the opening of the steel vessel 80 to effect a loose seal around the purge tube 44 and the upper portion of the steel vessel 80, but sufficient to maintain a substantially nitrogenous atmosphere in the steel vessel 80 during subsequent heating. A nitrogen gas flow rate of about 30 liters per minute into the stainless steel vessel 80 was established. The gas exited at the loose fitting junctions where the copper sheet 42 met the purge tube 44 and the lip of the stainless steel vessel 80.

The top cover of the furnace was replaced and the furnace was heated to a temperature of about 225° C. at a rate of about 400° C. per hour. After maintaining a temperature of about 225° C. for about 12 hours, the temperature was then increased to about 750° C. at a rate of about 400° C. per hour. After maintaining a temperature of about 750° C. for about 1½ hours, the top cover of the furnace was removed, the copper sheet was removed and about 22.7 kilograms of a molten matrix metal (not shown in the Figures) comprising about 12 weight percent silicon and the balance aluminum was poured into the lined stainless steel vessel 80 on top of the filler material admixture 25. The molten matrix metal began to spontaneously infiltrate the filler material admixture 25 almost immediately. The matrix metal was added in increments so as to be able to gauge more easily the progress of spontaneous infiltration. After the last increment of metal had been added, the stainless steel vessel 80 and its contents were held in the furnace at temperature for about an additional five minutes. Power to the furnace was then interrupted and the furnace and its contents were allowed to cool back to room temperature.

The stainless steel vessel 80 was cut open and the layers of GRAFOIL ® graphite foil 82 were removed to reveal that the matrix metal had infiltrated the filler material admixture 25 to form a highly loaded metal matrix composite. The excess uninfiltrated matrix metal at the top of the casting was removed with a diamond saw and the exterior surface of the highly loaded metal matrix composite ingot was cleaned by grit blasting.

About 107 lbs. (49 kilograms) of a second matrix metal comprising by weight about 6.5–7.5 percent silicon, about 0.17 to 0.25 percent magnesium, about 0.04 to 0.20 percent titanium <0.2 percent iron, <0.2 percent copper,, <0.10 percent manganese and <about 0.10 percent zinc and the balance aluminum (Aluminum Association Alloy No. 356) was placed into a crucible measuring about three feet (0.9 meter) high and having an opening measuring about two feet (0.6 meter) in diameter and heated with natural gas in air at atmospheric pressure. An investment shell mold having a shape and composition typical for the industry was fabricated so as to cast a tensile bar shape. The investment shell mold was heated to a temperature of about 593° C. in preparation for casting. When the approximately 107 lbs. (49 kilograms) of the second matrix metal had melted, about 160 lbs. (73 kilograms) of highly loaded metal matrix composite were added to the melt. When the contents of the crucible had reached a temperature of about 650° C., a rod was inserted into the melt to break down any remaining clumps of highly loaded metal matrix composites. An air driven impeller which had been flame sprayed with an alumina coating to minimize reaction with and contamination of the melt was inserted into the melt and the impeller was accelerated up to a rotation speed of about 200 rpm. After mixing the melt for about 10 minutes at a speed of about 200 rpm with the air-driven impeller to disperse the silicon carbide filler material throughout the first and second matrix metals, the impeller was turned off and removed from the melt. After readjusting the melt temperature to about 650° C., a portion of the melt was immediately cast into the approximately 593° C. investment shell mold. The mold and its contents were allowed to cool and solidify naturally.

Figure 11:
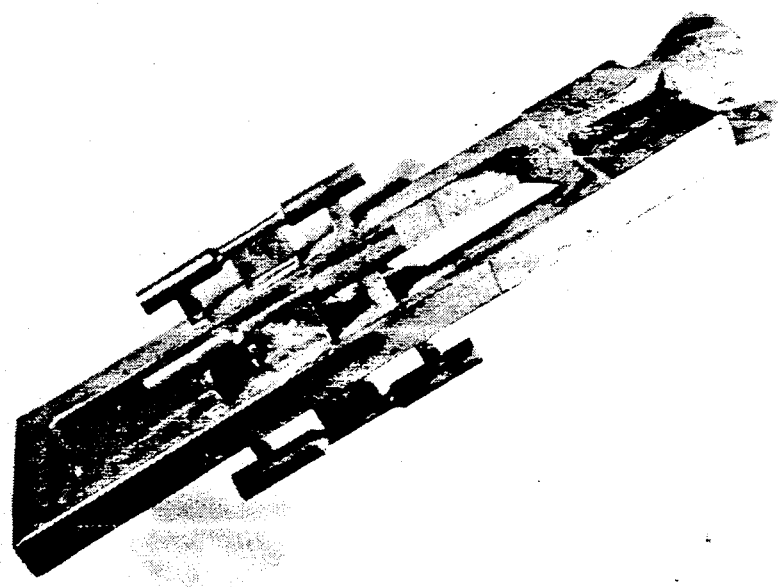
FIG. 11 is a photograph of the cast metal matrix composite tensile bar and its attached gates and risers whose fabrication is described in Example 8.

Once the investment shell mold and its contents had cooled to about room temperature, the investment shell was removed with light hammer blows to reveal the cast metal matrix composite body contained within. The metal matrix composite body comprised the tensile bar pattern and its attached gates and risers, as shown in FIG. 11.

A number of similar castings were made and the resulting cast metal matrix composite bodies were sectioned using a diamond saw and characterized using the characterization techniques described in Example 6.

The resonant frequency technique was used to determine the elastic properties of the composite. The shear modulus ranged from about 45 to about 48 GPa. The Yound's modulus ranged from about 120 to about 121 GPa.

The bulk density was measured by dividing the mass of a right rectangular specimen into its bulk volume as measured by its length, width and height. The bulk density ranged from about 2.74 to about 2.78 grams per cubic centimeter.

Quantitative imagine analysis was used to determine the approximate volume fractions of filler material porosity and matrix metal. The volume fraction of reinforcement filler ranged from about 26.6 to about 37.7 volume percent. The volume fraction of porosity ranged from about 0.9 to about 1.5 volume percent. The volume fraction of matrix metal ranged from about 61.4 to about 72.4 volume percent.

The thermal expansion coefficient of a sample was measured in the temperature interval between 50° and 150° C. at 50° C. intervals. The average thermal expansion coefficient averaged over the three reporting points was about 14.2 ppm/K.

Figure 12A:
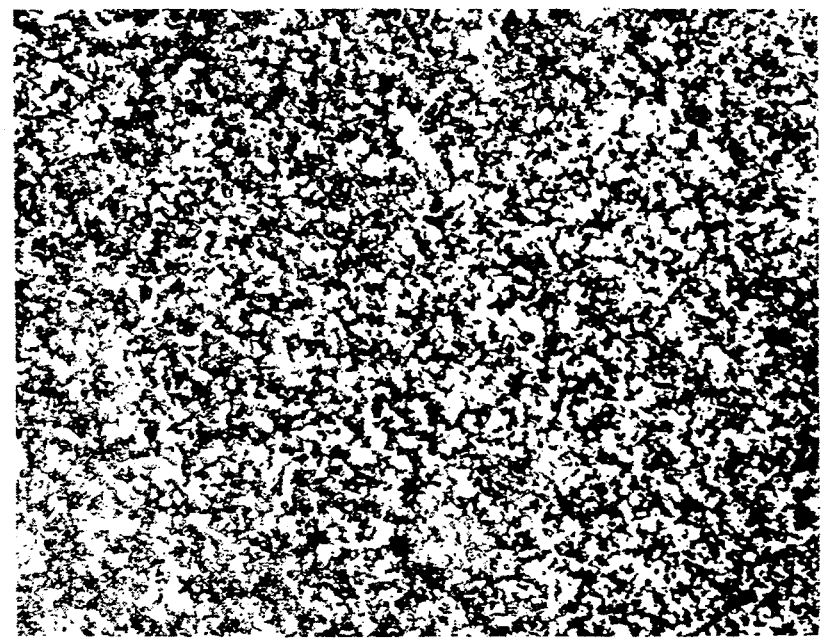
FIGS. 12a and 12b are optical photomicrographs taken at approximately 50 × and 400× magnifications, respectively, of a polished cross section of the cast metal matrix composite material formed in Example 8.
Figure 12B:
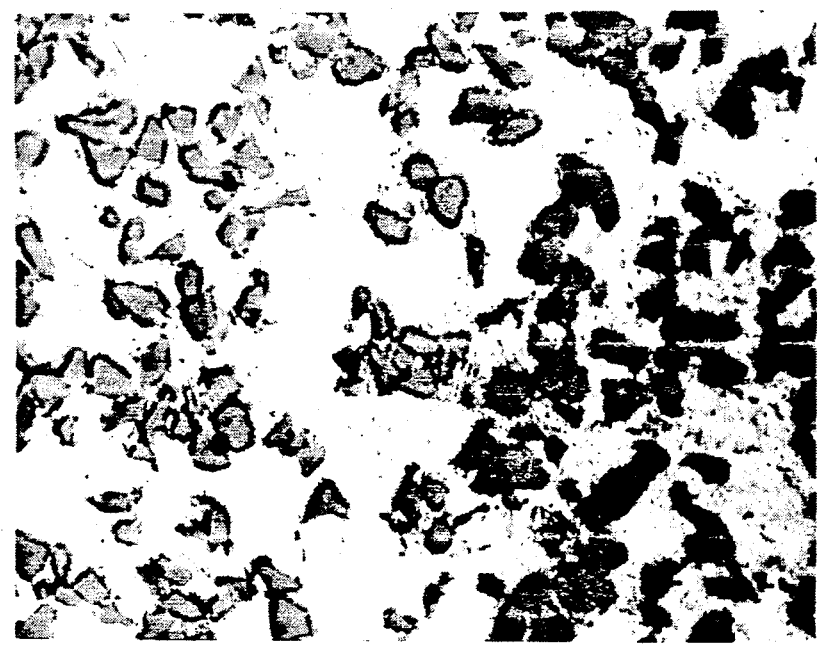

FIGS. 12a and 12b are optical photomicrographs taken at approximately 50× and 400× magnifications, respectively, of a polished section of the cast metal matrix composite material.

EXAMPLE 9

This Example further demonstrates the formation and casting of a metal matrix composite body having a reduced fraction of filler reinforced material on a scale larger than those described previously. The procedures employed in forming the suspension of filler material and the subsequent casting thereof were substantially the same as those described in the previous Example except where noted below.

About 315 lbs. (143 kilograms) of the highly loaded metal matrix composite material, which was made by techniques substantially similar to those described in Example 8. was added to about 155 lbs. (70 kilograms) of a melt whose composition was substantially the same as that described in Example 8 (Aluminum Association Alloy No. 356). The heat source comprised fuel oil. After remelting and dispersing the contents of the crucible, additional Alloy 356 was added to the melt in an effort to reduce the melt viscosity and thus render the composite more castable. After adding about 31 lbs. (14 kilograms) of additional 356 Alloy and dispersing the addition into the melt, an additional 62 lbs. (28 kilograms) of 356 Alloy was added to the melt and dispersed. Upon stabilization of the melt temperature at about 746° C., the viscosity was deemed to be acceptable and the metal matrix composite suspension was cast into a number of standard green sand mold at a temperature of about 16° C. The interior of one of the molds defined a fluidity spiral. Upon solidification of the cast metal matrix composite and the further cooling of the composite to about room temperature, the metal matrix composite was removed from the mold and its surface was cleaned of debris by grit blasting the surface of the casting with steel slot.

Figure 13:
FIG. 13 is a photograph of the cast fluidity spiral which is described in Example 9.

FIG. 13 is a photograph of the formed fluidity spiral of the cast metal matrix composite material.

A number of similar castings were made and the resulting cast metal matrix composite bodies were sectioned using a diamond saw and characterized using the characterization techniques described in Example 6.

The resonant frequency technique was used to determine the elastic properties of the composite. The shear modulus ranged from about 41 to about 51 GPa. The Yound's modulus ranged from about 120 to about 121 GPa.

The bulk density was measured by dividing the mass of a right rectangular specimen into its bulk volume as measured by its length, width and height. The bulk density ranged from about 2.67 to about 2.73 grams per cubic centimeter.

Quantitative imagine analysis was used to determine the approximate volume fractions of filler material porosity and matrix metal. The volume fraction of reinforcement filler ranged from about 26.6 to about 37.7 volume percent. The volume fraction of porosity ranged from about 0.8 to about 1.6 volume percent. The volume fraction of matrix metal ranged from about 67.4 to about 73.7 volume percent.

The thermal expansion coefficient of two samples was measured in the temperature interval between 50° and 150° C. at 50° C. intervals. The average thermal expansion coefficient of the two specimens averaged over the three reporting points was about 15.5 ppm/k.

Figure 14A:
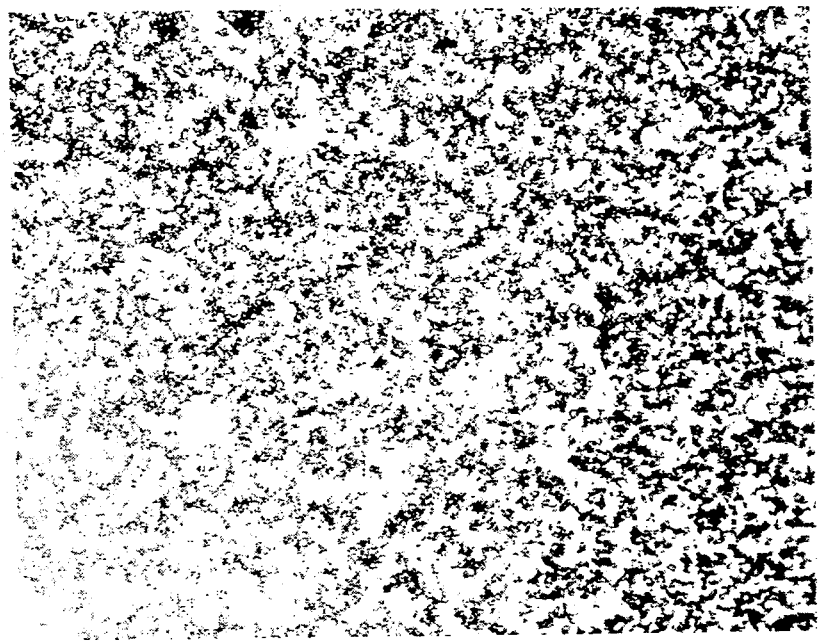
FIGS. 14a and 14b are optical photomicrographs taken at approximately 50× and 400× magnifications, respectively, of a polished cross section of the cast metal matrix composite material formed in Example 9.
Figure 14B:
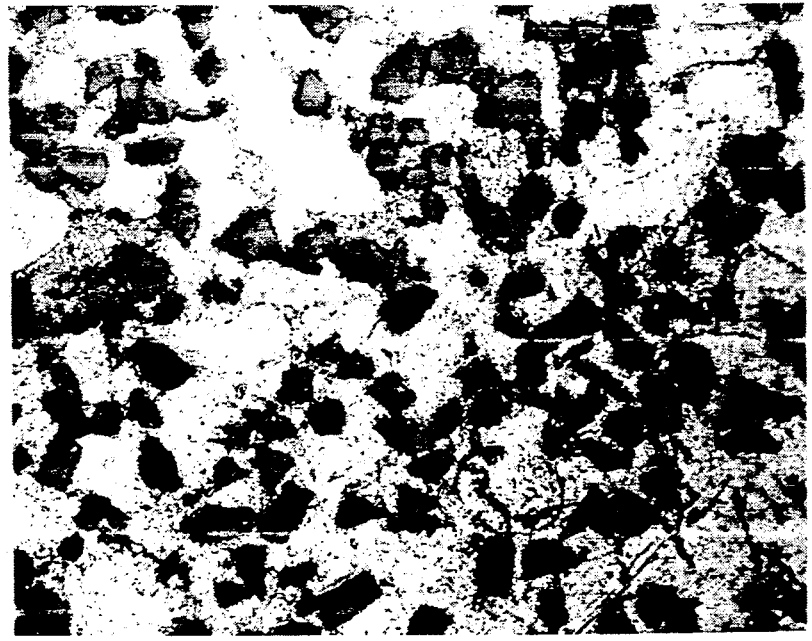

FIGS. 14a and 14b are optical photomicrographs taken at approximately 50× and 400× magnifications, respectively, of a polished cross section of another cast metal matrix composite which was cast and solidified in this Example in a green sand mold having the same composition but a geometry different from that used in casting the fluidity spiral shape.

What is claimed is:

1. A method for forming a shaped metal matrix composite body, comprising:
   forming a permeable mass with molten matrix metal;

spontaneously infiltrating at least a portion of the permeable mass to form a highly loaded metal matrix composite body;

introducing said highly loaded metal matrix composite body and a second matrix metal into a container having a cavity for retaining said highly loaded metal matrix composite body and said second matrix metal;

heating said highly loaded metal matrix composite body and said second matrix metal to at least the liquidus temperatures of the matrix metal of said highly loaded metal matrix composite body and said second matrix metal to form a molten suspension;

mixing said molten suspension to substantially uniformly disperse said filler material within said molten suspension;

providing a mold having a shaped cavity therein;

pouring said molten suspension out of said cavity in said container and into said shaped cavity within said mold; and cooling said suspension to form a shaped metal matrix composite body.

2. The method of claim 1, wherein the composition of said second matrix metal is different from the composition of the matrix metal of said highly loaded metal matrix composite body.

3. The method of claim 1, wherein the composition of said second matrix metal is substantially the same as the composition of the matrix metal of said highly loaded metal matrix composite body.

4. The method of claim 1, wherein said mold having a shaped cavity therein comprises an investment shell mold.

5. The method of claim 1, wherein said highly loaded metal matrix composite body is introduced into said container at a temperature which is below the liquidus temperature of said matrix metal of said highly loaded metal matrix composite body and said second metal is introduced into said container at a temperature which is below the liquidus temperature of said second matrix metal.

6. The method of claim 1, wherein said highly loaded metal matrix composite body is introduced into said container at a temperature which is above the liquidus temperature of the matrix metal of said highly loaded metal matrix composite body and said second matrix metal is introduced into said container at a temperature which is below the liquidus temperature of said second matrix metal.

7. The method of claim 1, wherein said highly loaded metal matrix composite body is introduced into said container at a temperature which is below the liquidus temperature of the matrix metal of said highly loaded metal matrix composite body and said second matrix metal is introduced into said container at a temperature which is above the liquidus temperature of said second matrix metal.

8. The method of claim 7, further comprising, after said heating step, crushing or comminuting said highly loaded metal matrix composite body to assist in said mixing of said molten suspension.

9. A method for forming a metal matrix composite body, comprising:

forming a permeable mass of filler material;

providing at least one of an infiltration enhancer and an infiltration enhancer precursor to at least one of a matrix metal and said permeable mass of filler material to cause spontaneous infiltration of the matrix metal, when made molten, into the permeable mass of filler material;

infiltrating the permeable mass of filler material to a desired extent to form a highly loaded metal matrix composite body;

introducing said highly loaded metal matrix composite body and a second matrix metal into a container having a cavity for retaining said highly loaded metal matrix composite body and said second matrix metal;

heating said highly loaded metal matrix composite body and said second matrix metal to at least the liquidus temperatures of the matrix metal of said highly loaded metal matrix composite body and said second matrix metal to form a molten suspension;

mixing said molten suspension to substantially uniformly disperse said filler material within said molten suspension;

providing a mold having a shaped cavity therein;

pouring said molten suspension out of said cavity in said container and into said shaped cavity within said mold; and cooling said suspension to form a shaped metal matrix composite body.

10. The method of claim 9, wherein the composition of said second matrix metal is different from the composition of the matrix metal of said highly loaded metal matrix composite body.

11. The method of claim 9, wherein the composition of said second matrix metal is the same as the composition of the matrix metal of said highly loaded metal matrix composite body.

12. The method of claim 9, wherein said mold having a shaped cavity therein comprises an investment shell mold.

13. A method for making a shaped metal matrix composite, comprising:

providing a substantially non-reactive filler;

spontaneously infiltrating at least a portion of the filler with molten matrix metal;

supplying additional matrix metal to said spontaneously infiltrated filler to form a suspension, wherein said filler is substantially uniformly dispersed in said matrix metal;

providing a mold having a shaped cavity therein;

pouring said suspension into said shaped cavity of said mold; and cooling said suspension to form a shaped metal matrix composite body.

14. The method of claim 13, wherein an infiltrating atmosphere communicates with at least one of the filler and the matrix metal for at least a portion of the period of infiltration.

15. The method of claim 14, further comprising the step of supplying at least one of an infiltration enhancer precursor and an infiltration enhancer to at least one of the matrix metal, the filler and the infiltrating atmosphere.

16. The method of claim 15, wherein the infiltration enhancer is formed by reacting an infiltration enhancer precursor and at least one species selected from the group consisting of the infiltrating atmosphere, a material added to the filler and the matrix metal.

17. The method of claim 16, wherein during infiltration, the infiltration enhancer precursor volatilizes.

18. The method of claim 17, wherein the volatilized infiltration enhancer precursor reacts to form a reaction product in at least a portion of the filler.

19. The method of claim 18, wherein the reaction product comprises a nitride of magnesium.

20. The method of claim 14, wherein the matrix metal comprises aluminum, the infiltration enhancer precursor comprises magnesium, and the infiltrating atmosphere comprises nitrogen.

21. The method of claim 13, wherein said matrix metal comprises aluminum and at least one alloying element selected from the group consisting of silicon, iron, copper, manganese, chromium, zinc, calcium, magnesium and strontium.

22. The method of claim 13, wherein said shaped metal matrix composite has a particle loading of about 5 through about 40 volume percent.

* * * * *